US008200169B2

(12) United States Patent
Fujii et al.

(10) Patent No.: US 8,200,169 B2
(45) Date of Patent: Jun. 12, 2012

(54) TRANSMITTER APPARATUS, MOBILE COMMUNICATION SYSTEM, BASE STATION AND COMMUNICATION ENABLE SIGNAL TRANSMITTER APPARATUS

(75) Inventors: Hiromasa Fujii, Yokosuka (JP);
Junichiro Hagiwara, Yokohama (JP);
Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1100 days.

(21) Appl. No.: 12/038,456

(22) Filed: Feb. 27, 2008

(65) Prior Publication Data

US 2008/0207239 A1    Aug. 28, 2008

(30) Foreign Application Priority Data

Feb. 28, 2007  (JP) .............................. P2007-050372
Jan. 18, 2008  (JP) .............................. P2008-009714

(51) Int. Cl.
*H04B 1/02* (2006.01)

(52) U.S. Cl. ......... 455/92; 455/114.2; 455/88; 375/346; 375/220

(58) Field of Classification Search .................. 455/424, 455/425, 456.5, 456.6, 561, 550.1, 575.1, 455/266, 509, 513, 524, 63.1, 16, 67.11, 455/296, 278.1, 285, 91; 375/148, 254, 278, 375/346; 370/231, 256, 328, 335, 347, 395.42
See application file for complete search history.

(56) References Cited

U.S. PATENT DOCUMENTS

| | | | | |
|---|---|---|---|---|
| 4,716,407 A | * | 12/1987 | Borras et al. .................... 340/2.4 |
| 5,392,286 A | * | 2/1995 | Tanaka et al. .................. 370/231 |
| 5,511,233 A | * | 4/1996 | Otten ............................. 455/524 |
| 5,732,076 A | * | 3/1998 | Ketseoglou et al. .......... 370/347 |

(Continued)

FOREIGN PATENT DOCUMENTS

CN           1846384 A        10/2006

OTHER PUBLICATIONS

"Part 11: Wireless LAN Medium Access Control (MAC) and Physical Layer (PHY) specifications Amendment 5: Spectrum and Transmit Power Management Extensions in the 5 GHz band in Europe", International Standard, ISO/IEC 8802-11, IEEE, 92 pages, Jul. 15, 2006.

(Continued)

*Primary Examiner* — Duc Nguyen
*Assistant Examiner* — Charles Chow
(74) *Attorney, Agent, or Firm* — Oblon, Spivak, McClelland, Maier & Neustadt, L.L.P.

(57) ABSTRACT

The present invention has an object of providing a transmitter apparatus, a mobile communication system, a base station and a communication enable signal transmitter unit, which can prioritize communications of a mobile station in a priority communication system over communications of a mobile station in a non-priority communication system, in a network where the priority communication system and the non-priority communication system coexist in the same communication area.

The non-priority communication transmitter apparatuses 10B and 30B comprise signal transmitter units 16 and 17 configured to be enabled to transmit, to the non-priority communication receiver apparatuses 10B and 30B, a signal by using a frequency channel of a second frequency band, when the non-priority communication transmitter apparatuses 10B and 30B receive a communication enable signal from a priority communication system or when the non-priority communication transmitter apparatuses 10B and 30B detect that the non-priority communication transmitter apparatuses 10B and 30B has received the communication enable signal.

4 Claims, 17 Drawing Sheets

U.S. PATENT DOCUMENTS

| | | | |
|---|---|---|---|
| 6,438,385 B1* | 8/2002 | Heinonen et al. | 455/501 |
| 6,449,461 B1* | 9/2002 | Otten | 455/63.1 |
| 6,606,496 B1* | 8/2003 | Salvarani et al. | 455/436 |
| 6,993,294 B2* | 1/2006 | Nobukiyo et al. | 455/67.11 |
| 7,406,105 B2* | 7/2008 | DelMain et al. | 370/519 |
| 2002/0042836 A1* | 4/2002 | Mallory | 709/232 |
| 2004/0208140 A1* | 10/2004 | Noguchi et al. | 370/328 |
| 2004/0242154 A1* | 12/2004 | Takeda et al. | 455/16 |
| 2004/0248603 A1* | 12/2004 | Canoy | 455/513 |
| 2006/0084404 A1* | 4/2006 | Laroia et al. | 455/266 |
| 2006/0209746 A1* | 9/2006 | Asai et al. | 370/328 |
| 2007/0036111 A1* | 2/2007 | Breuer et al. | 370/335 |
| 2007/0189305 A1* | 8/2007 | Fujimoto et al. | 370/395.42 |
| 2008/0025235 A1* | 1/2008 | Mahany et al. | 370/256 |
| 2008/0144858 A1* | 6/2008 | Khawand et al. | 381/99 |
| 2009/0186621 A1* | 7/2009 | Umeda et al. | 455/446 |
| 2011/0009141 A1* | 1/2011 | Harada et al. | 455/509 |

OTHER PUBLICATIONS

Office Action issued on Aug. 1, 2011 in the corresponding Chinese Patent Application No. 200810009899.8 (with English Translation).

* cited by examiner

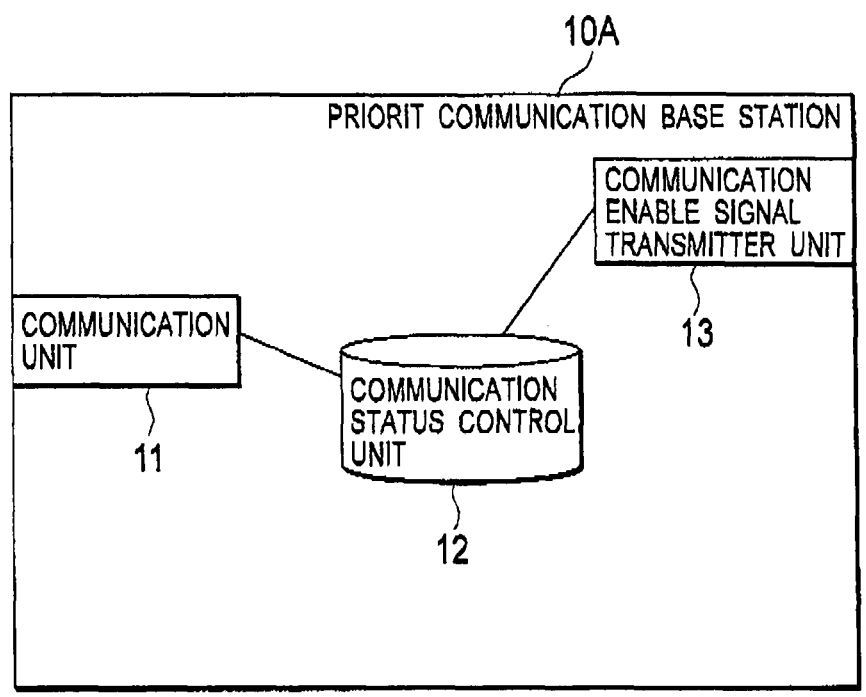

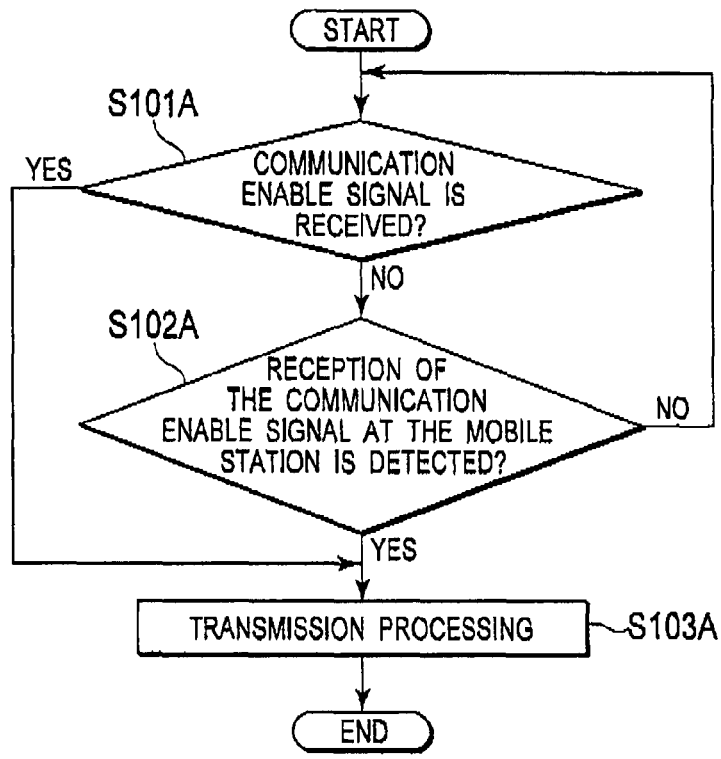
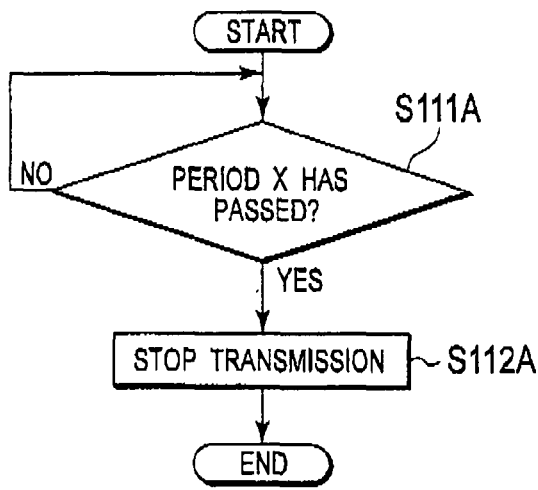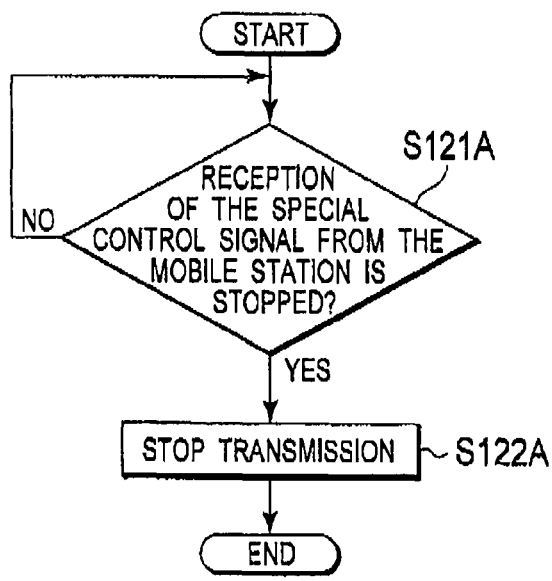

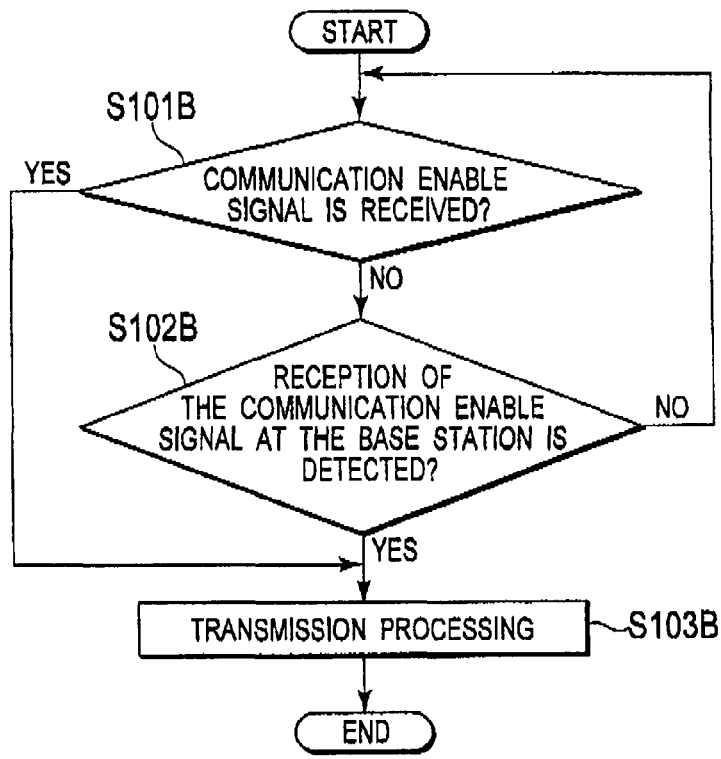
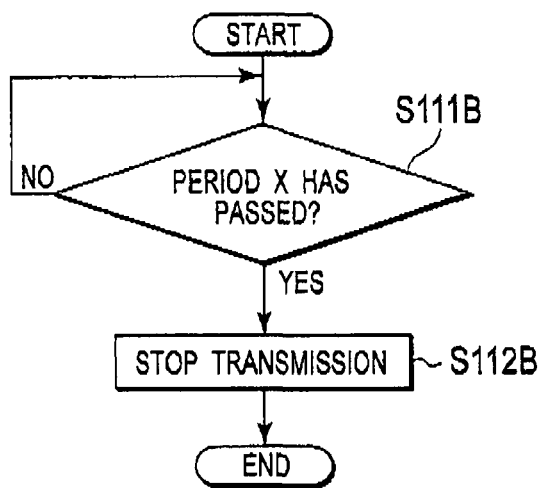
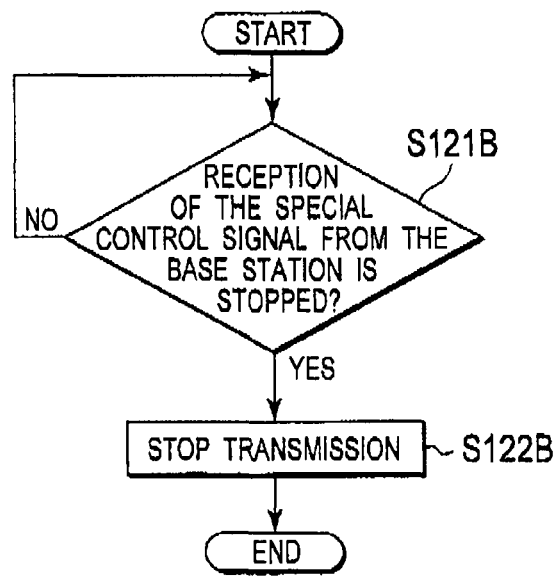

TRANSMITTER APPARATUS, MOBILE COMMUNICATION SYSTEM, BASE STATION AND COMMUNICATION ENABLE SIGNAL TRANSMITTER APPARATUS

CROSS REFERENCE TO RELATED APPLICATION

The present application is based upon and claims the benefit of priority from the prior Japanese Patent Application No. 2008-009714 filed on Jan. 18, 2008 and Japanese Patent Application No. 2007-050372 filed on Feb. 28, 2007; the entire contents of which are incorporated herein by reference.

BACKGROUND OF THE INVENTION

1. Field of the Invention

The present invention relates to a transmitter apparatus used in a non-priority communication system that uses a second frequency band adjacent to a first frequency band utilized in a priority communication system.

Further, the present invention relates to a mobile communication system, a base station, and a communication enable signal transmitter unit, which include a first priority communication system performing a first priority communication by using a first frequency band, a second priority communication system performing a second priority communication by using a second frequency band and has a priority level lower than the first priority communication, and a non-priority communication system by using a third frequency band, in which the first frequency band, the second frequency band, and the third frequency band are adjacent to each other.

In addition, the present invention relates to a communication enable signal transmitter apparatus and a priority communication system performing a priority communication by using the first frequency band and a non-priority communication system by using the second frequency band, in which the first frequency band and the second frequency band are adjacent to each other.

2. Description of the Related Art

Conventionally, there is known a communication system in which a mobile station is configured to transmit signals by using a frequency channel of a specific frequency band, when a transmission or a reception of the signals to and from other mobile stations are not detected in the specific frequency channel. (see Non-Patent literature 1: IEEE802.11h, "Part 11: Wireless LAN Medium Access Control (MAC) and Physical Layer (PHY) specifications" 2003).

In recent years, in order to utilize frequency bands effectively, there has been designed a network in which a priority communication system that performs a priority communication by using a frequency channel of a first frequency band, and a non-priority communication system that performs a communication by using a second frequency band adjacent to the first frequency band, coexist in the same communication area.

This network is supposed to prioritize communications of a mobile station for priority communications (hereinafter referred to as a priority communication mobile station) over communications of a mobile station for non-priority communications (hereinafter referred to as a non-priority communication mobile station).

However, in the above-described network, there has been a problem that the priority communication mobile station that desires to perform a communication by using the frequency channel of the first frequency band, when the non-priority communication mobile station transmits a signal by using the frequency channel of the first frequency band and when a transmission or a reception of the signals to and from the priority communication mobile station are not detected.

Moreover, as shown in FIG. 1, when a signal from a priority communication base station 10A does not reach a non-priority communication mobile station 30B due to a long distance between the priority communication base station 10A and the non-priority communication mobile station 30B, the non-priority communication mobile station 30B fails to detect communications performed in the priority communication system. Accordingly, this network has another problem that signals transmitted from the non-priority communication mobile station 30B may act as interference signals to a priority communication mobile station 30A.

In addition, as shown in FIG. 2, when a transmission power of signals transmitted from the priority communication mobile station 30A is weaker than a transmission power of signals transmitted from the non-priority communication mobile station 30B, the non-priority communication mobile station 30B fails to detect the signals transmitted from the priority communication mobile station 30A. In such a case, a problem also arises that signals transmitted from the non-priority communication mobile station 30B may act as interference signals to the priority communication mobile station 30A.

Further, when the network includes a plurality of the non-priority communication mobile stations 30B, the non-priority communication mobile stations 30B is required to extract and detect the signals transmitted from the priority communication mobile station 30A among interference signals transmitted from each of the plurality of the non-priority communication mobile stations 30B. Here, a problem also arises that the non-priority communication mobile station 30B may fail to start a communication by using the frequency channel of the second frequency band when a detection accuracy of the non-priority communication mobile station 30B deteriorates.

Furthermore, when the priority communication base station 10A constantly transmits a control signal in the network, the non-priority communication mobile station 30B may also fail to start the communication to by using the frequency channel of the second frequency band.

The present invention has been made in consideration of the foregoing problems, and has an object to provide a transmitter apparatus, a mobile communication system, a base station and a communication enable signal transmitter unit, which can prioritize communications of a mobile station in a priority communication system over communications of a mobile station in a non-priority communication system, in a network where the priority communication system and the non-priority communication system coexist in the same communication area. Here, the priority communication system performs a communication by using a frequency channel of a first frequency band while the non-priority communication system performs a communication by using of a frequency channel of a second frequency band adjacent to the first frequency band.

BRIEF SUMMARY OF THE INVENTION

As has been described above, a first aspect of the present invention is summarized as a transmitter apparatus used in a non-priority communication system that uses a second frequency band adjacent to a first frequency band utilized in a priority communication system, including: a signal transmitter unit configured to be enabled to transmit, to a receiver apparatus used in the non-priority communication system, a signal by using a frequency channel of the second frequency band, when the signal transmitter unit receives a communication enable signal transmitted from the priority communication system or when the transmitter apparatus detects that the receiver apparatus has received the communication enable signal.

According to this invention, the non-priority communication transmitter apparatus can transmit a signal to the non-priority communication receiver apparatus only when either of the non-priority communication transmitter apparatus or the non-priority communication receiver apparatus receives the communication enable signal from the priority communication system. Accordingly, it is possible to prioritize communications of the priority communication transmitter apparatus and the priority communication receiver apparatus over communications of the non-priority communication transmitter apparatus and the non-priority communication receiver apparatus in the network where the priority communication system and the non-priority communication system coexist.

For example, the non-priority communication base station is configured to be enabled to transmit a signal to the non-priority communication mobile station only when either of the non-priority communication base station or the non-priority communication mobile station receives the communication enable signal from the priority communication system. Accordingly, it is possible to prioritize communications of the priority communication base station over communications of the non-priority communication base station in the network where the priority communication system and the non-priority communication system coexist.

Further, the non-priority communication mobile station is configured to be enabled to transmit a signal to the non-priority communication base station only when either of the non-priority communication base station or the non-priority communication mobile station receives the communication enable signal from the priority communication system. Accordingly, it is possible to prioritize communications of the priority communication mobile station over communications of the non-priority communication mobile station in the network where the priority communication system and the non-priority communication system coexist.

In the first aspect of the present invention, the signal transmitter unit may be configured to be enabled to transmit the signal when the transmitter apparatus receives the communication enable signal and when the transmitter apparatus detects that the receiver apparatus has received the communication enable signal.

According to this invention, the non-priority communication transmitter apparatus is configured to transmit signals to the non-priority communication receiver apparatus, only when both the non-priority communication transmitter apparatus and the non-priority communication receiver apparatus receive the communication enable signals transmitted from the priority communication system. Accordingly, this mobile communication system can prioritize communications of a priority communication transmitter apparatus and the priority communication receiver apparatus over communications of the non-priority communication transmitter apparatus and the non-priority communication receiver apparatus more strictly in the network where the priority communication system and the non-priority communication system coexist.

For example, according to this invention, the non-priority communication base station is configured to transmit signals to the non-priority communication mobile station, only when both the non-priority communication base station and the non-priority communication mobile station receive the communication enable signals transmitted from the priority communication system. Accordingly, this mobile communication system can prioritize communications of a priority communication base station over communications of the non-priority communication base station more strictly in the network where the priority communication system and the non-priority communication system coexist.

Further, according to this invention, the non-priority communication mobile station is configured to transmit signals to the non-priority communication base station, only when both the non-priority communication base station and the non-priority communication mobile station receive the communication enable signals transmitted from the priority communication system. Accordingly, this mobile communication system can prioritize communications of a priority communication mobile station over communications of the non-priority communication mobile station more strictly in the network where the priority communication system and the non-priority communication system coexist.

In the first aspect of the present invention, the signal transmitter unit may be configured to be enabled to transmit the signal only while either the transmitter apparatus or the receiver apparatus is receiving the communication enable signal.

According to this invention, it is possible to instantly start the desired communication using the frequency channel of the first frequency band, between the priority communication transmitter apparatus and the priority communication receiver apparatus, by stopping the transmission of the communication enable signal.

For example, according to this invention, it is possible to instantly start the desired communication using the frequency channel of the first frequency band, between the priority communication base station and the priority communication mobile station, by stopping the transmission of the communication enable signal.

In the first aspect of the present invention, the signal transmitter unit may be configured to be enabled to transmit the signal for a predetermined period when either the transmitter apparatus or the receiver apparatus receives the communication enable signal.

According to this invention, the communication enable signal is not required to constantly transmit, when the transmitter apparatus allows the non-priority communication system to perform a communication. Accordingly, the radio resource can be utilized effectively.

In the first aspect of the present invention, the communication enable signal may be configured to specify at least a part of the second frequency band, and the signal transmitter unit may be configured to be enabled to transmit the signal by using a frequency channel of the specified part of the second frequency band.

According to this invention, the transmitter apparatus can allow the non-priority communication system to perform the communication by using the frequency channel of the second frequency band that may not affect the communication in the priority communication system. Accordingly, the frequency band can be utilized effectively.

In the first aspect of the present invention, the communication enable signal may be configured to specify a communication area, and the signal transmitter unit may be configured to be enabled to transmit the signal to a receiver apparatus in the specified communication area.

According to this invention, it is possible to allow the non-priority communication system to perform the communication by using the frequency channel of the second frequency band that may not affect the communication in the priority communication area. Accordingly, the frequency band can be utilized effectively.

In the first aspect of the present invention, the communication enable signal may be configured to specify the predetermined period, and the signal transmitter unit may be configured to be enabled to transmit the signal only for the specified predetermined period.

According to this invention, the aforementioned predetermined period is adjustable, therefore if there is a time period when the priority communication system does not perform communications, the non-priority communication system is allowed to perform communications for the time period, no matter how short the time period is. In this way, the frequency band can be utilized effectively.

In the first aspect of the present invention, the communication enable signal may be configured to specify an allowable transmission power, and the signal transmitter unit may be configured to be enabled to transmit the signal at the specified allowable transmission power.

According to the mobile communication system of this invention, it is possible to allow the non-priority communication system to perform the communication by using the frequency channel of the second frequency band at the transmission power that may not affect the communication in the priority communication area. Accordingly, the frequency band can be utilized effectively.

In the first aspect of the present invention, the signal transmitter unit may be configured to determine that the receiver apparatus received the communication enable signal when the transmitter apparatus receives a special control signal transmitted from the receiver apparatus.

According to this invention, it is possible to notify, to the non-priority communication transmitter apparatus, that the communication enable signal has been received at the non-priority communication receiver apparatus, by using a special control signal that may not affect any communications in the priority communication system.

For example, according to this invention, it is possible to notify, to the non-priority communication base station, that the communication enable signal has been received at the non-priority communication mobile station, by using a special control signal that may not affect any communications in the priority communication system.

Further, according to this invention, it is possible to notify, to the non-priority communication mobile station, that the communication enable signal has been received at the non-priority communication base station, by using a special control signal that may not affect any communications in the priority communication system.

In the first aspect of the present invention, the signal transmitter unit may be configured to shorten the predetermined period when either the transmitter apparatus or the receiver apparatus receives the communication enable signal through a relay apparatus.

According to this invention, it is possible to allow the non-priority communication system to perform the communication by using the frequency channel of the second frequency band in consideration of the delay time according to the relay apparatus.

In the first aspect of the present invention, the transmitter apparatus may be a base station, and the receiver apparatus may be a mobile station. Further, the receiver apparatus may be a base station, and the transmitter apparatus may be a mobile station.

In the first aspect of the present invention, the signal transmitter unit may be configured to stop transmitting the signal when a control signal that should be constantly transmitted from the base station to the transmitter apparatus is not received.

According to this invention, the non-priority communication base station can determine whether or not the communication enable signal is received at the non-priority communication base station, according to the receipt or non-receipt of the control signal that should be transmitted constantly from the non-priority communication base station. Therefore, the non-priority communication base station does not have to transmit a new control signal, and thereby traffic can be reduced.

A second aspect of the present invention is summarized as a mobile communication system including: a first priority communication system which performs a first priority communication by using a first frequency band, a second priority communication system which performs a second priority communication by using a second frequency band and has a lower priority level than the first priority communication, and a non-priority communication system which uses a third frequency band, wherein the first frequency band, the second frequency band, and the third frequency band are adjacent to each other, a first communication enable signal transmitter apparatus in the first priority communication system is configured to transmit a first communication enable signal to allow the second priority communication system to perform a communication by using a frequency channel of the second frequency band, in accordance with location information of a first base station in the first priority communication system and a communication status of a first mobile station in the first priority communication system, a second base station in the second priority communication system is configured to be enabled to transmit, to a second mobile station, a signal by using a frequency channel of the second frequency band, when the second base station receives the first communication enable signal from the first priority communication system or when the second base station detects that the second mobile station in the second priority communication system has received the first communication enable signal, a second communication enable signal transmitter apparatus in the second priority communication system is configured to transmit a second communication enable signal to allow the non-priority communication system to perform a communication by using a frequency channel of the third frequency band, in accordance with the first communication enable signal, location information of the second base station and a communication status of the second mobile station, and a third base station in the non-priority communication system is configured to be enabled to transmit, to a third mobile station, a signal by using a frequency channel of the third frequency band, when the third base station receives the second communication enable signal from the second priority communication system or when the third base station detects that the third mobile station in the non-priority communication system has received the second communication enable signal.

A third aspect of the present invention is summarized as a base station used in a second priority communication system in a mobile communication system including a first priority communication system which performs a first priority communication by using a first frequency band, the second priority communication system which performs a second priority communication by using a second frequency band and has a lower priority level than the first priority communication, and a non-priority communication system which uses a third frequency band, wherein the first frequency band, the second frequency band, and the third frequency band are adjacent to each other, the base station including: a signal transmitter unit configured to be enabled to transmit, to a mobile station, a signal by using a frequency channel of the second frequency band, when the base station receives a first communication enable signal from the first priority communication system or when the base station detects that the mobile station in the second priority communication system has received the first communication enable signal.

A fourth aspect of the present invention is summarized as a communication enable signal transmitter apparatus used in a second priority communication system in a mobile communication system including a first priority communication system which performs a first priority communication by using a first frequency band, the second priority communication system which performs a second priority communication by using a second frequency band and has a lower priority level than the first priority communication, and a non-priority communication system which uses a third frequency band, wherein the first frequency band, the second frequency band, and the third frequency band are adjacent to each other, the communication enable signal transmitter apparatus including: a communication enable signal receiver unit configured to receive a first communication enable signal from the first priority communication system, and a communication enable signal transmitter unit configured to transmit a second communication enable signal for allowing the non-priority communication system to perform a communication by using a frequency channel of the third frequency band, in accordance with the first communication enable signal, location information of a base station in the second priority communication system, and a communication status of a mobile station in the second priority communication system.

A fifth aspect of the present invention is summarized as a mobile communication system including a priority communication system which performs a priority communication by using a first frequency band, and a non-priority communication system which uses a second frequency band adjacent to the first frequency band, wherein a communication enable signal transmitter apparatus in the priority communication system is configured to transmit a communication enable signal that specifies an allowable transmission power and to allow the non-priority communication system to perform a communication by using a frequency channel of the second frequency band, in accordance with location information of a priority communication base station in the priority communication system, a communication status of a priority communication mobile station in the priority communication system, and a propagation loss amount between the priority communication base station and the communication enable signal transmitter apparatus, and a non-priority communication base station in the non-priority communication system is configured to be enabled to perform the communication at the allowable transmission power, by using a frequency channel of the second frequency band, between the non-priority communication base station and the non-priority communication mobile station, when the non-priority communication base station receives the communication enable signal from the non-priority communication system, or when the non-priority communication base station detects that the non-priority communication mobile station in the non-priority communication system has received the communication enable signal.

A sixth aspect of the present invention is summarized as a communication enable signal transmitter apparatus used in a priority communication system in a mobile communication system including a priority communication system which performs a priority communication by using a first frequency band, and a non-priority communication system which uses a second frequency band adjacent to the first frequency band, the communication enable signal transmitter apparatus including: a communication enable signal transmitter unit configured to transmit a communication enable signal that specifies an allowable transmission power and to allow the non-priority communication system to perform a communication by using a frequency channel of the second frequency band, in accordance with location information of a priority communication base station in the priority communication system, a communication status of a priority communication mobile station in the priority communication system, and a propagation loss amount between the priority communication base station and the communication enable signal transmitter apparatus.

As described above, the present invention can provide a transmitter apparatus, a mobile communication system, a base station and a communication enable signal transmitter unit, which can prioritize communications of a mobile station in a priority communication system over communications of a mobile station in a non-priority communication system, in a network where the priority communication system and the non-priority communication system coexist in the same communication area.

BRIEF DESCRIPTION OF THE DRAWINGS

FIG. 5 is a functional block diagram of a priority communication base station according to the first embodiment of the present invention.

FIG. 6 is a diagram for showing one example of a format of a communication enable signal transmitted from a communication enable signal transmitter unit in the priority communication base station according to the first embodiment of the present invention.

FIG. 9 is a flowchart showing an operation of the non-priority communication base station in the mobile communication system according to the first embodiment of the present invention.

FIGS. 10A and 10B are flowcharts showing the operation of the non-priority communication base station in the mobile communication system according to the first embodiment of the present invention.

FIG. 11 is a flowchart showing the operation of the non-priority communication mobile station in the mobile communication system according to the first embodiment of the present invention.

FIGS. 12A and 12B are flowcharts showing the operation of the non-priority communication mobile station in the mobile communication system according to the first embodiment of the present invention.

DESCRIPTION OF THE PREFERRED EMBODIMENTS (A Configuration of a Mobile Communication System According to a First Embodiment of the Present Invention)

A configuration of a mobile communication system according to a first embodiment of the present invention will be described by referring to FIGS. 3 to 8.

Figure 1:
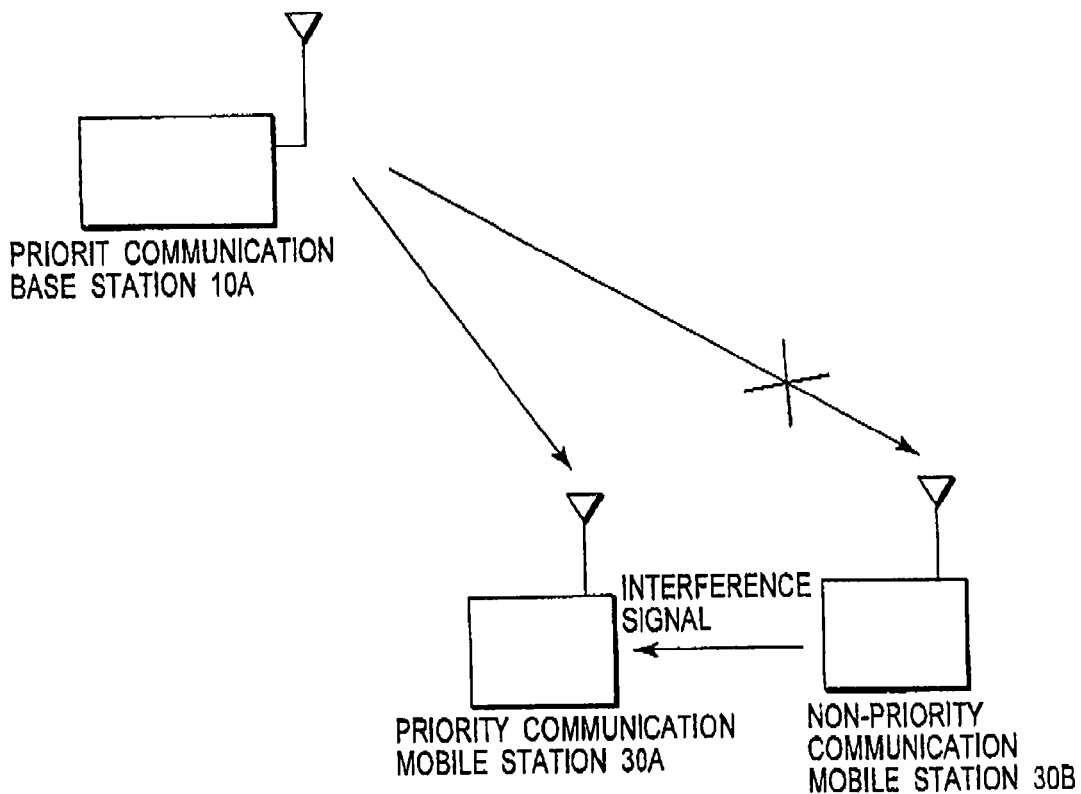
FIG. 1 is a diagram for describing a conventional mobile communication system.
Figure 2:
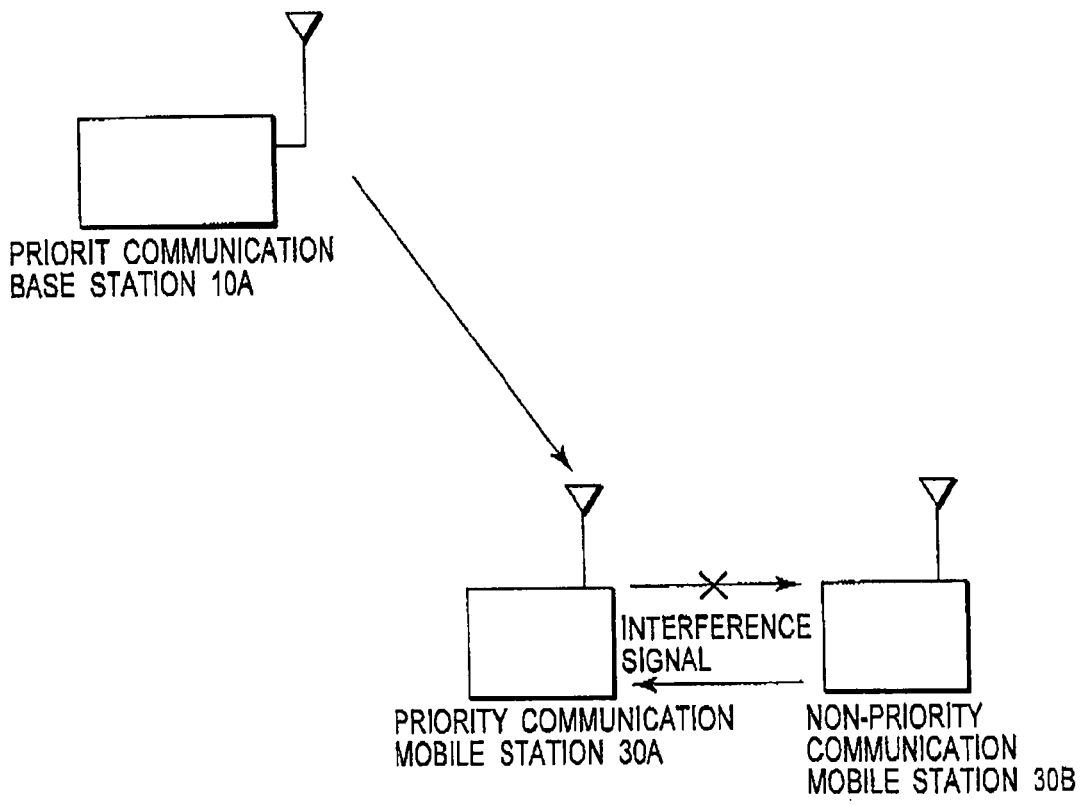
FIG. 2 is a diagram for describing the conventional mobile communication system.
Figure 3:
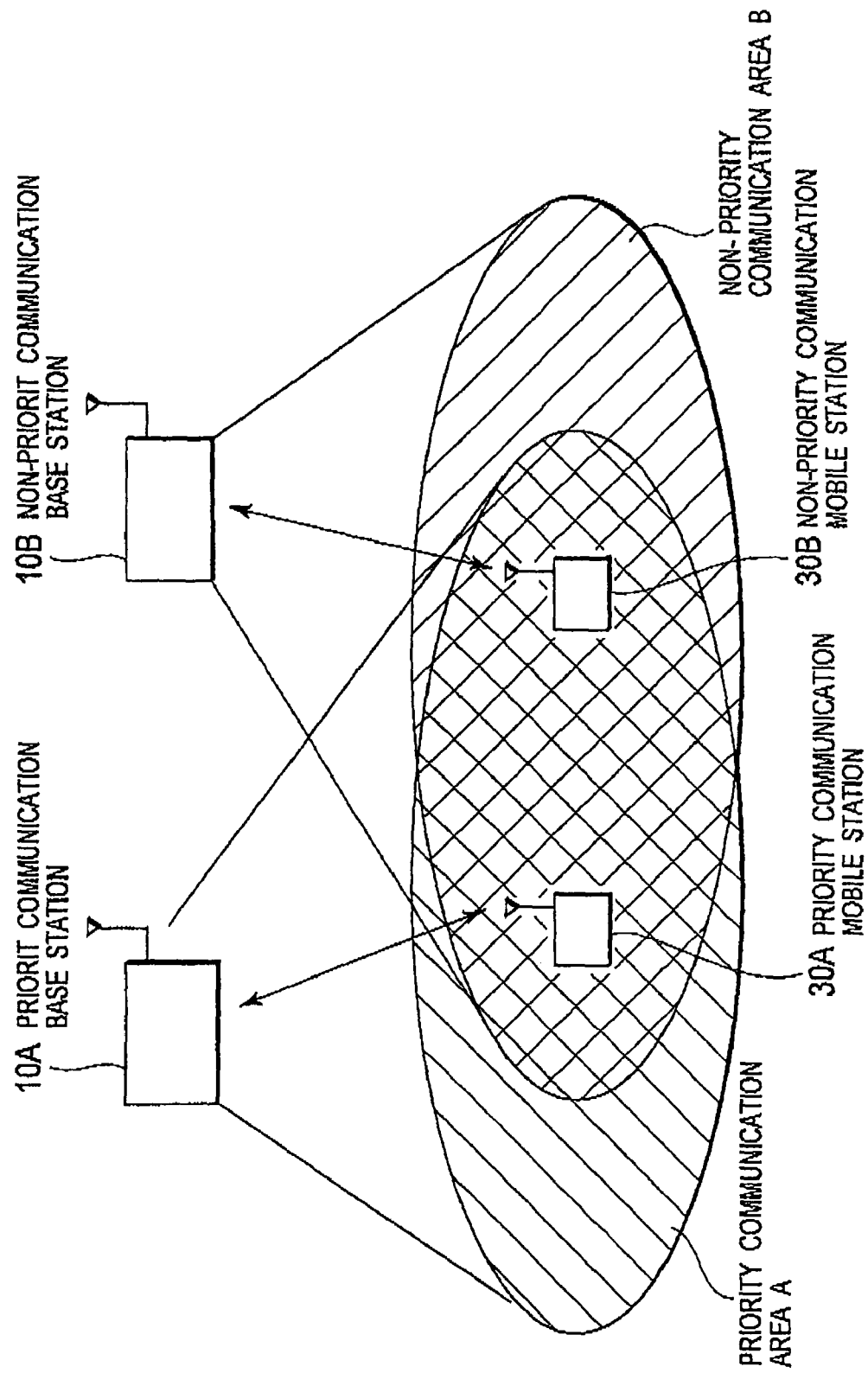
FIG. 3 is a functional block of an entire configuration of a mobile communication system according to the first embodiment of the present invention.

As shown in FIG. 3, a priority communication system and a non-priority communication system coexist in a mobile communication system according to this embodiment. The priority communication system is configured to perform communications in a priority communication area A by using a frequency channel of a priority communication frequency band A (first frequency band), while the non-priority communication system is configured to perform communications in a non-priority communication area B by using a frequency channel of a non-priority communication frequency band B (second frequency band) adjacent to the priority communication frequency band A.

The priority communication system according to this embodiment is configured so that a priority communication base station 10A can communicate with a priority communication mobile station 30A in the priority communication area A by using a frequency channel of the priority communication frequency band A. The non-priority communication system according to this embodiment is configured so that a non-priority communication base station 10B can communicate with a non-priority communication mobile station 30B in the non-priority communication area B by using a frequency channel of the non-priority communication frequency band B.

This embodiment provides a description for both a case where a transmitter apparatus is a base station and a receiver apparatus is a mobile station, and a case where a transmitter apparatus is a mobile station and a receiver apparatus is a base station, respectively. The present invention, however, is not limited to the above two cases, and is also applicable to P2P communications such as ad-hoc communications and wireless LAN communications, or the like.

According to this embodiment, as shown in FIG. 3, in the priority communication system, a priority communication base station 10A is configured to control the communication of the priority communication mobile station 30A located in the priority communication area A. Meanwhile, in the non-priority communication system, a non-priority communication base station 10B is configured to control the communication of the non-priority mobile station 30 B located in the non-priority communication area B. Here, the priority communication mobile station 30A communicates by using a frequency channel of the priority communication frequency band A while the non-priority communication mobile station 30B communicates by using a frequency channel of the non-priority communication frequency band B.

The priority communication area A and the non-priority communication area B at least partially overlap with each other.

Figure 4A:
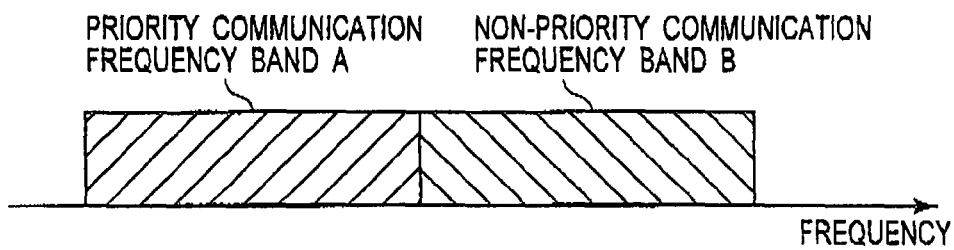
FIGS. 4A to 4C are diagrams showing frequency usage statuses in the mobile communication system according to the first embodiment of the present invention.
Figure 4B:
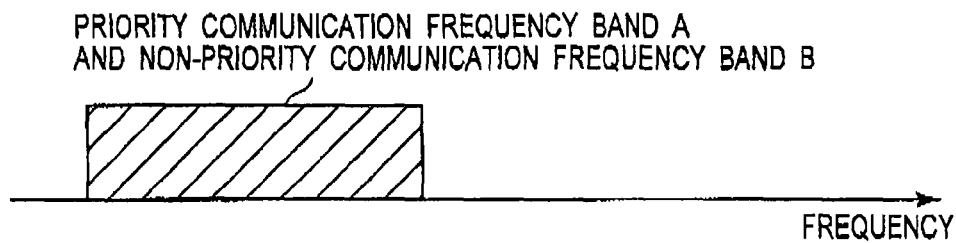
Figure 4C:
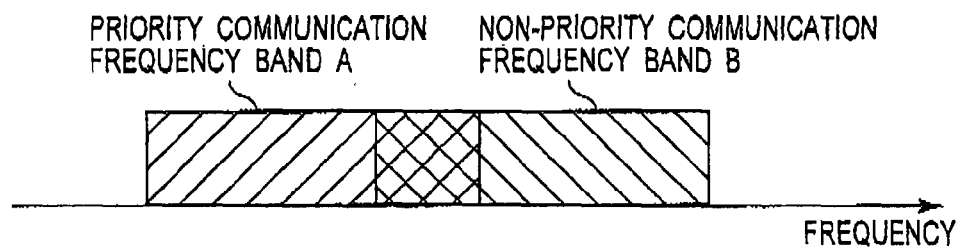

Moreover, in this description, "the priority communication frequency band A and the non-priority communication frequency band B are adjacent to each other" means not only the two frequency bands are adjacent to each other without overlapping at all as shown in FIG. 4A, but also the two frequency bands completely overlap with each other as shown in FIG. 4B, and also the two frequency bands partially overlap with each other as shown in FIG. 4C.

Note that the non-priority communication system may be provided with a frequency band that can be used without allowed by the priority communication system, in addition to the non-priority communication frequency band B.

As shown in FIG. 5, the priority communication base station 10A according to this embodiment includes a communication unit 11, a communication status control unit 12, and a communication enable signal transmitter unit 13.

The communication unit 11 is configured to perform a radio communications with the priority communication mobile station 30A located in the priority communication area A.

The communication status control unit 12 is configured to control a communication condition of the priority communication mobile station 30A in the priority communication area A.

The communication enable signal transmitter unit 13 is configured to transmit, to the non-priority communication system, a communication enable signal for allowing a communication using a frequency channel of the non-priority frequency band B in the non-priority communication system, in accordance with the communication status of the priority communication mobile station 30A in the communication area A controlled by the communication status control unit 12.

For example, the communication enable signal transmitter unit 13 is configured to transmit the communication enable signal when the communication is performed by using the frequency channel of the non-priority communication frequency band B and when it is determined that the priority communication mobile station 30A is not performing the communication by using the frequency channel of the priority communication frequency band A that might be largely influenced if the communications using the frequency channel of the non-priority communication frequency band B is performed.

In addition, the communication enable signal transmitter unit 13 may be configured to specify at least a part of the non-priority communication frequency band B when transmitting the communication enable signal. Here, the specified part is a frequency band that may not affect any communications using the frequency channel of the priority communication frequency band A (communications in the priority communication system).

Moreover, the communication enable signal transmitter unit 13 may also be configured to specify a communication area that may not affect any communications using the frequency channel of the priority communication frequency band A (communications in the priority communication system), when transmitting the communication enable signal.

Additionally, the communication enable signal transmitter unit 13 may be configured to specify an allowable transmission power that may not affect any communications using the frequency channel of the priority communication frequency band A (communications in the priority communication system), when transmitting the communication enable signal.

Further, the communication enable signal transmitter unit 13 may be configured to specify a predetermined period X that may not affect any communications using the frequency channel of the priority communication frequency band A (communications in the priority communication system), when transmitting the communication enable signal.

FIG. 6 shows an example of a format of the communication enable signal transmitted from the communication enable signal transmitter unit 13.

As shown in FIG. 6, the communication enable signal includes: "a frequency band" specifying at least a part of the non-priority communication frequency band B; "a communication area" specifying the communication area; "a period" specifying the predetermined period X; and "an allowable transmission power" specifying the allowable transmission power.

Note that, the communication enable signal may be a signal specially transmitted for allowing the communication as described above, or may be a signal prepared to use for another purpose (for example, channel allocation and the like) in the priority communication system.

Further, the communication enable signal may be transmitted in either the priority communication frequency band A or in the non-priority communication frequency band B.

Figure 7:
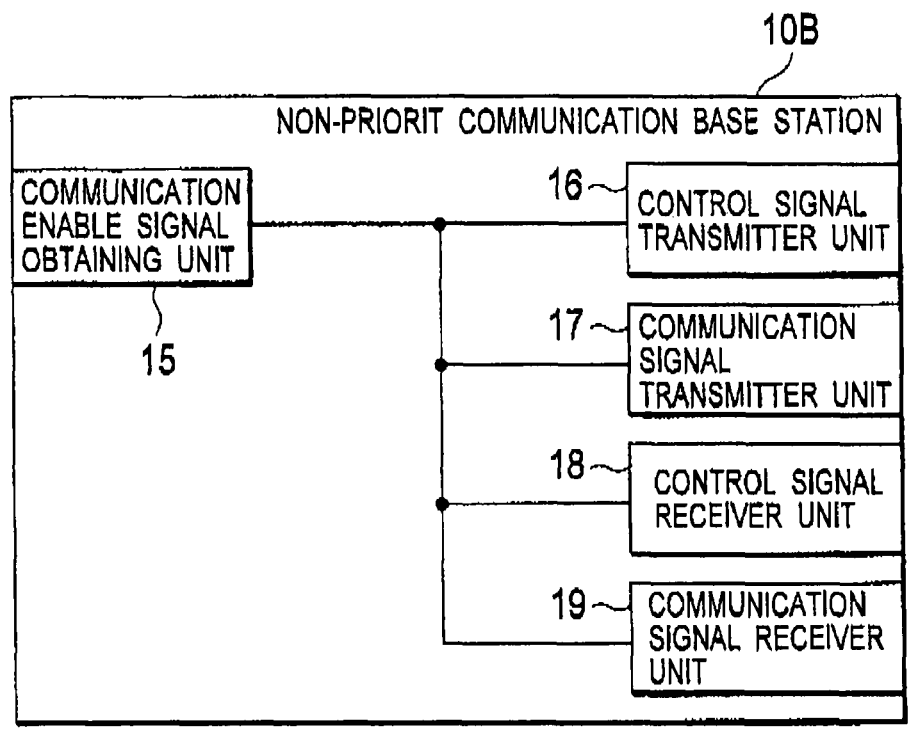
FIG. 7 is a functional block diagram of a non-priority communication base station according to the first embodiment of the present invention.

As shown in FIG. 7, the non-priority communication base station 10B according to this embodiment includes a communication enable signal obtaining unit 15, a control signal transmitter unit 16, a communication signal transmitter unit 17, a control signal receiver unit 18 and a communication signal receiver unit 19.

The communication enable signal obtaining unit 15 is configured to obtain the communication enable signal transmitted from the priority communication system (specifically, the priority communication base station 10A).

The control signal transmitter unit 16 is configured to transmit the control signal to the non-priority communication mobile station 30B by using a frequency channel of the non-priority communication frequency band B. The communication signal transmitter unit 17 is configured to transmit the communication signal to the non-priority communication mobile station 30B by using the frequency channel of the non-priority communication frequency band B.

Note that the control signal transmitter unit 16 or the communication signal transmitter unit 17 may be configured to transmit a special control signal to notify, to the non-priority communication mobile station 30B, that the communication enable signal has been received, by using a particular frequency channel that may not affect any communications using the frequency channels in the priority communication frequency band A, when the non-priority communication base station 10B receives (or is receiving) the communication enable signal.

Specifically, the control signal transmitter unit 16 may be configured to be enabled to transmit, to the non-priority communication mobile station 30B, the control signal by using a frequency channel of the non-priority communication frequency band B, when the control signal transmitter unit 16 receives the communication enable signal transmitted from the priority communication system or when the control signal transmitter unit 16 detects that the non-priority communication mobile station 30B (mobile station used in the non-priority communication system) has received the communication enable signal.

Further, the communication signal transmitter unit 17 may be configured to be enabled to transmit, to the non-priority communication mobile station 30B, the communication signal by using a frequency channel of the non-priority communication frequency band B, when the control signal transmitter unit 16 receives the communication enable signal transmitted from the priority communication system or when the control signal transmitter unit 16 detects that the non-priority communication mobile station 30B (mobile station used in the non-priority communication system) has received the communication enable signal.

For example, the control signal transmitter unit 16 may be configured to be enabled to transmit the control signal only while either the non-priority communication base station 10B or the non-priority communication mobile station 30B is receiving the communication enable signal.

The communication signal transmitter unit 17 may be configured to be enabled to transmit the communication signal only while either the non-priority communication base station 10B or the non-priority communication mobile station 30B is receiving the communication enable signal.

Here, the control signal transmitter unit 16 may be configured to stop transmitting the control signal that should be constantly transmitted to the non-priority communication mobile station 30B, when the reception of the communication enable signal at the non-priority communication base station 10B has been completed.

Alternatively, the control signal transmitter unit 16 may be configured to be enabled to transmit the control signal only for the predetermined period X, when the non-priority communication base station 10B or the non-priority communication mobile station 30B receives the communication enable signal.

The communication signal transmitter unit 17 may be configured to be enabled to transmit the communication signal only for the predetermined period X, when the non-priority communication base station 10B or the non-priority communication mobile station 30B receives the communication enable signal.

Here, the control signal transmitter unit 16 may be configured to stop transmitting the control signal that should be constantly transmitted to the non-priority communication mobile station 30B, when the predetermined period X passed after the non-priority communication base station 10B received the communication enable signal.

In addition, the control signal transmitter unit 16 may be configured to be enabled to transmit the control signal by using the frequency channel of at least a part of the non-priority communication frequency band B specified by "the frequency band" in the communication enable signal.

The communication signal transmitter unit 17 may be configured to be enabled to transmit the communication signal by using the frequency channel of at least a part of the non-priority communication frequency band B specified by "the frequency band" in the communication enable signal.

Moreover, the control signal transmitter unit 16 may be configured to be enabled to transmit the control signal to the non-priority communication mobile station 30B located in a communication area specified by "the communication area" in the communication enable signal.

The communication signal transmitter unit 17 may be configured to be enabled to transmit the communication signal to the non-priority communication mobile station 30B located in a communication area specified by "the communication area" in the communication enable signal.

Additionally, the control signal transmitter unit 16 may be configured to be enabled to transmit the control signal for the predetermined period X specified by "the period" in the communication enable signal.

The communication signal transmitter unit 17 may be configured to be enabled to transmit the communication signal for the predetermined period X specified by "the period" in the communication enable signal.

Further, the control signal transmitter unit 16 may be configured to be enabled to transmit the control signal at an allowable transmission power specified by "the allowable transmission power" in the communication enable signal.

The communication signal transmitter unit 17 may be configured to be enabled to transmit the communication signal at an allowable transmission power specified by "the allowable transmission power" in the communication enable signal.

Furthermore, the control signal transmitter unit 16 and the communication signal transmitter unit 17 may be configured to determine that the non-priority communication mobile station 30B receives (or is receiving) the communication enable signal, when a special control signal is received from the non-priority communication mobile station 30B.

In addition, the control signal receiver unit 18 is configured to receive the control signal transmitted from the non-priority communication mobile station 30B. The communication signal receiver unit 19 is configured to receive the communication signal transmitted from the non-priority communication mobile station 30B.

Here, at least one of the control signal receiver unit 18 and the communication signal receiver unit 19 is configured to receive the aforementioned special control signal transmitted from the non-priority communication mobile station 30B.

Figure 8:
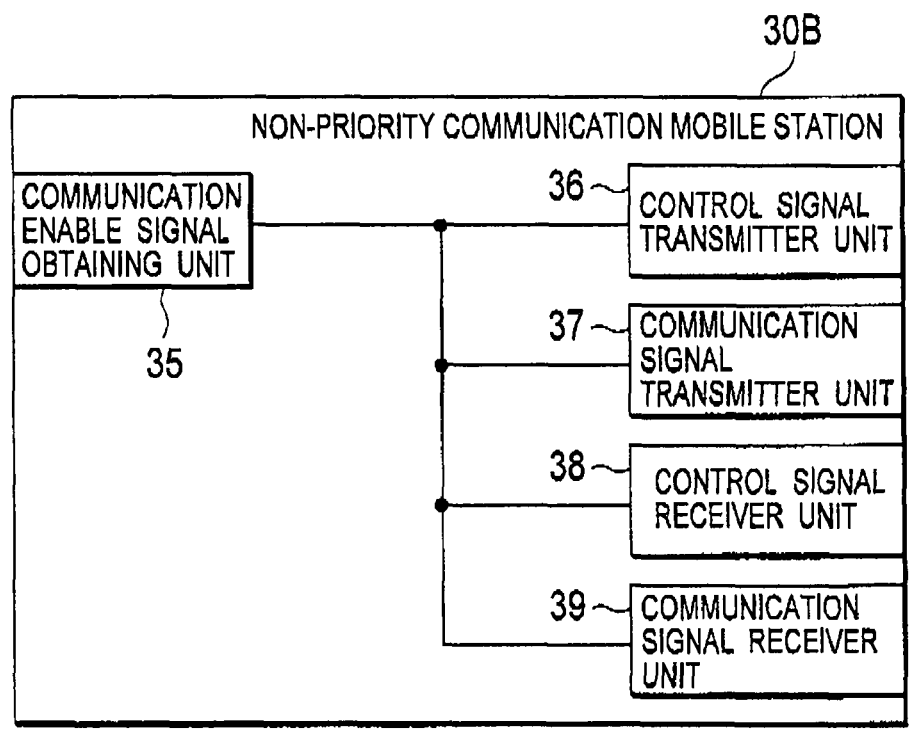
FIG. 8 is a functional block diagram of a non-priority communication mobile station according to the first embodiment of the present invention.

As shown in FIG. 8, the non-priority communication mobile station 30B according to this embodiment includes a communication enable signal obtaining unit 35, a control signal transmitter unit 36, a communication signal transmitter unit 37, a control signal receiver unit 38 and a communication signal receiver unit 39.

The communication enable signal obtaining unit 35 is configured to obtain the communication enable signal transmitted from the priority communication system (specifically, the priority communication base station 10A).

The control signal transmitter unit 36 is configured to transmit the control signal to the non-priority communication base station 10B by using the frequency channel of the non-priority communication frequency band B. The communication signal transmitter unit 37 is configured to transmit the communication signal to the non-priority communication base station 10B by using a frequency channel of the non-priority communication frequency band B.

Note that the control signal transmitter unit 36 or the communication signal transmitter unit 37 may be configured to transmit a special control signal to notify, to the non-priority communication base station 10B, that the communication enable signal was received, when the non-priority communication mobile station 30B receives (or is receiving) the communication enable signal.

Here, the special control signal may be transmitted by using a particular frequency channel that may not affect the communications using the frequency channels in the priority communication frequency band A.

Specifically, the control signal transmitter unit 36 may be configured to be enabled to transmit, to the non-priority communication base station 10B, the control signal by using a frequency channel of the non-priority communication frequency band B, when the non-priority communication base station receives the communication enable signal transmitted from the priority communication system or when the non-priority communication base station (base station used in the non-priority communication system) 10B detects that the non-priority communication base station has received the communication enable signal.

Further, the communication signal transmitter unit 37 may be configured to be enabled to transmit, to the non-priority communication mobile station 10B, the communication signal by using the frequency channel of the non-priority communication frequency band B, when the communication signal transmitter unit 37 receives the communication enable signal transmitted from the priority communication system or when the communication signal transmitter unit 37 detects that the non-priority communication base station 10B (base station used in the non-priority communication system) has received the communication enable signal.

For example, the control signal transmitter unit 36 may be configured to be enabled to transmit the control signal only while either the non-priority communication base station 10B or the non-priority communication mobile station 30B is receiving the communication enable signal.

The communication signal transmitter unit 37 may be configured to be enabled to transmit the communication signal only while either the non-priority communication base station 10B or the non-priority communication mobile station 30B is receiving the communication enable signal.

Alternatively, the control signal transmitter unit 36 may be configured to be enabled to transmit the control signal only for the predetermined period X, when the non-priority communication base station 10B or the non-priority communication mobile station 30B receives the communication enable signal.

The communication signal transmitter unit 37 may be configured to be enabled to transmit the communication signal only for the predetermined period X, when either the non-priority communication base station 10B or the non-priority communication mobile station 30B receives the communication enable signal.

In addition, the control signal transmitter unit 36 may be configured to be enabled to transmit the control signal by using a frequency channel of at least the part of the non-priority communication frequency band B specified by "the frequency band" in the communication enable signal.

The communication signal transmitter unit 37 may be configured to be enabled to transmit the communication signal by using the frequency channel of at least a part of the non-priority communication frequency band B specified by "the frequency band" in the communication enable signal.

Moreover, the control signal transmitter unit 36 may be configured to be enabled to transmit the control signal to the non-priority communication mobile station 30B located in a communication area specified by "the communication area" in the communication enable signal.

The communication signal transmitter unit 37 may be configured to be enabled to transmit the communication signal to the non-priority communication base station 10B located in a communication area specified by "the communication area" in the communication enable signal.

Additionally, the control signal transmitter unit 36 may be configured to be enabled to transmit the control signal for the predetermined period X specified by "the period" in the communication enable signal.

The communication signal transmitter unit 37 may be configured to be enabled to transmit the communication signal for the predetermined period X specified by "the period" in the communication enable signal.

Further, the control signal transmitter unit 36 may be configured to be enabled to transmit the control signal at an allowable transmission power specified by "the allowable transmission power" in the communication enable signal.

The communication signal transmitter unit 37 may be configured to be enabled to transmit the communication signal at an allowable transmission power specified by "the allowable transmission power" in the communication enable signal.

Furthermore, the control signal transmitter unit 36 and the communication signal transmitter unit 37 may be configured to determine that the non-priority communication base station 10B receives (or is receiving) the communication enable signal, when a special control signal is received from the non-priority communication base station 10B.

Moreover, the control signal transmitter unit 36 may be configured to stop transmitting the control signal when a control signal that should be constantly transmitted from non-priority communication base station 10B to the non-priority communication mobile station 30B is not received.

Additionally, the communication signal transmitter unit 37 may be configured to stop transmitting the communication signal when a control signal that should be constantly transmitted from non-priority communication base station 10B to the non-priority communication mobile station 30B is not received.

In addition, the control signal receiver unit 38 is configured to receive the control signal transmitted from the non-priority communication base station 10B. The communication signal receiver unit 39 is configured to receive the communication signal transmitted from the non-priority communication base station 10B.

Here, at least one of the control signal receiver unit 38 and the communication signal receiver unit 39 is configured to receive the aforementioned special control signal transmitted from the non-priority communication base station 10B.

Furthermore, the control signal receiver unit 38 is configured to receive the control signal that should be constantly transmitted from the non-priority communication base station 10B by using a predetermined frequency channel.

(Operations of the Mobile Communication System in the First Embodiment of the Present Invention)

By referring to FIGS. 9, 10A and 10B, descriptions will be provided for operations of the mobile communication system according to this embodiment.

Firstly, the operation of the non-priority communication base station 10B will be described by referring to FIGS. 9, 10A and 10B.

As shown in FIG. 9, in step S101A, the non-priority communication base station 10B determines whether or not the non-priority communication base station 10B has received the communication enable signal from the priority communication system.

If it is determined that the communication enable signal has been received, the operation moves forward to step S103A. Otherwise, the operation moves forward to step S102A.

In step S102A, the non-priority communication base station 10B determines whether or not the non-priority communication mobile station 30B has received the communication enable signal from the priority communication system.

Here, the non-priority communication base station 10B determines that the non-priority communication mobile station 30B has received the communication enable signal when the non-priority communication base station 10B receives a special control signal transmitted from the non-priority communication mobile station 30B.

Incidentally, the non-priority communication mobile station 30B may transmit the special control signal through a particular frequency channel. Here, the particular frequency channel indicates a channel that may not affect any communications which use frequency channels in the priority communication frequency band A.

If it is determined that the non-priority communication mobile station 30B has received the communication enable signal, the operation moves forward to step S103A. Otherwise, the operation moves back to step S101A.

In step S103A, the non-priority communication base station 10B starts a transmission processing for a control signal and a communication signal to the non-priority communication mobile station 30B by using a frequency channel of the non-priority communication frequency band B. In a case where the non-priority communication base station 10B started the transmission processing for the control signal and the communication signal in response to the receipt of the communication enable signal from the priority communication system, the non-priority communication base station 10B determines in step S111A whether or not a predetermined period X has already passed after the communication enable signal was received, as shown in FIG. 10A. Here, the predetermined period X is a time period indicated by a value specified in the communication enable signal received in step S101A.

Note that, the non-priority communication base station 10B is configured to update the predetermined period X, by checking receipts of the communication enable signal constantly at regular intervals or at certain timings before the predetermined period X passes, even once after the communication enable signal was received and the transmission processing for the control signal and the communication signal was started.

If it is determined "YES" in step S111A, the operation moves forward to step S112A, while if it is determined "NO" in step S111A, the operation of step S111A is repeatedly executed.

In step S112A, the non-priority communication base station 10B stops the transmission processing for the control signal and the communication signal.

On the other hand, in a case where the non-priority communication base station 10B started the transmission processing for the control signal and the communication signal in response to the receipt of the special control signal from the non-priority communication mobile station 30B, the non-priority communication base station 10B determines in step S121A whether or not the non-priority communication base station 10B has stopped receiving the special control signal transmitted from the non-priority communication mobile station 30B, as shown in FIG. 10B.

If it is determined "YES" in step S121A, the operation moves forward to step S122A, while if it is determined "NO" in step S121A, the operation of step S121A is repeatedly executed.

In step S122A, the non-priority communication base station 10B stops the transmission processing for the control signal and the communication signal.

Secondly, the operation of the non-priority communication mobile station 30B will be described by referring to FIG. 11.

As shown in FIG. 11, in step S101B, the non-priority communication mobile station 30B determines whether or not the non-priority communication mobile station 30B has received the communication enable signal from the priority communication system.

If it is determined that the communication enable signal has been received, the operation moves forward to step S103B. Otherwise, the operation moves forward to step S102B.

In step S102B, it is determined whether or not the non-priority communication base station 10B has received the communication enable signal from the priority communication system.

Here, the non-priority communication mobile station 30B determines that the non-priority communication base station 10B has received the communication enable signal when the non-priority communication mobile station 30B receives a special control signal transmitted from the non-priority communication base station 10B.

Incidentally, the non-priority communication base station 10B may transmit the special control signal through the particular frequency channel. Here, the particular frequency channel indicates a channel that may not affect any communications which use frequency channels in the priority communication frequency band A.

If it is determined that non-priority communication base station 10B has received the communication enable signal, the operation moves forward to step S103B. Otherwise, the operation moves back to step S101B.

In step S103B, the non-priority communication mobile station 30B starts a transmission processing for the control signal and the communication signal to the non-priority communication base station 10B by using a frequency channel of the non-priority communication frequency band B.

In a case where the non-priority communication mobile station 30B started the transmission processing for the control signal and the communication signal in response to the receipt of the communication enable signal from the priority communication system, the non-priority communication mobile station 30B determines in step S111B whether or not a predetermined period X has already passed after the communication enable signal was received, as shown in FIG. 12A. Here, the predetermined period X is a time period indicated by a value specified in the communication enable signal received in step S101B.

Note that, the non-priority communication mobile station 30B is configured to update the predetermined period X, by checking the receipts of the communication enable signal constantly at regular intervals or at certain timings before the predetermined period X passes, even once after the communication enable signal was received and the transmission processing for the control signal and the communication signal was started.

If it is determined "YES" in step S111B, the operation moves forward to step S112B, while if it is determined "NO" in step S111B, the operation of step S111B is repeatedly executed.

In step S112B, the non-priority communication mobile station 30B stops the transmission processing for the control signal and the communication signal.

On the other hand, in a case where the non-priority communication base station 10B started the transmission processing for the control signal and the communication signal in response to the receipt of the special control signal from the non-priority communication base station 10B, the non-priority communication mobile station 30B determines in step S121B whether or not the non-priority communication mobile station 30B has stopped receiving the special control signal transmitted from the non-priority communication base station 10B, as shown in FIG. 12B.

If it is determined "YES" in step S121B, the operation moves forward to step S122B, while if it is determined "NO" in step S121B, the operation of step S121B is repeatedly executed.

In step S122B, the non-priority communication mobile station 30B stops the transmission processing for the control signal and the communication signal.

(Effects of the Mobile Communication System According to the First Embodiment of the Present Invention)

The mobile communication system according to the first embodiment of the present invention is configured such that the non-priority communication base station 10B can transmit a signal to the non-priority communication mobile station 30B only when either of the non-priority communication base station 10B or the non-priority communication mobile station 30B receives the communication enable signal from the priority communication system. Accordingly, this mobile communication system can prioritize communications of the priority communication mobile station 30A over communications of the non-priority communication mobile station 30B in the network where the priority communication system and the non-priority communication system coexist.

The mobile communication system according to the first embodiment of the present invention is configured such that the non-priority communication mobile station 30B can transmit a signal to the non-priority communication base station 10B only when either one of the non-priority communication base station 10B or the non-priority communication mobile station 30B receives the communication enable signal from the priority communication system. Accordingly, this mobile communication system can prioritize communications of the priority communication mobile station 30A over communications of the non-priority communication mobile station 30B in the network where the priority communication system and the non-priority communication system coexist.

In the mobile communication system according to the first embodiment of the present invention, the priority communication system does not have to constantly transmit the communication enable signal to allow the non-priority communication system to perform communications. Consequently, radio resources can be utilized effectively.

The mobile communication system according to the first embodiment of the present invention is capable of allowing the non-priority communication system to perform communications using a frequency channel of the non-priority communication frequency band (second frequency band) B that may not affect communications in the priority communication system. Thus, the frequency band can be utilized effectively.

The mobile communication system according to the first embodiment of the present invention is capable of allowing the non-priority communication system to perform communications using a frequency channel of the non-priority communication frequency band (second frequency band) B in the communication area that may not affect communications in the priority communication system. Accordingly, the frequency band can be utilized effectively.

In the mobile communication system according to the first embodiment of the present invention, a time length of the aforementioned predetermined period is adjustable. If there is a time period when the priority communication system does not perform communications, the non-priority communication system is allowed to perform communications for the time period, no matter how short the time period is. In this way, the frequency band can be utilized effectively.

Moreover, the mobile communication system according to the first embodiment of the present invention is capable of allowing the non-priority communication system to perform communications using a frequency channel of the non-priority communication frequency band (second frequency band) B at a transmission power that may not affect communications in the priority communication system. Thus, the frequency band can be utilized effectively.

The mobile communication system according to the first embodiment of the present invention is capable of informing the non-priority communication base station 10B, by using the special control signal, that the non-priority communication mobile station 30B has received the communication enable signal.

The mobile communication system according to the first embodiment of the present invention is capable of informing the non-priority communication mobile station 30B, by using the special control signal, that the non-priority communication base station 10B has received the communication enable signal.

In the mobile communication system according to the first embodiment of the present invention, the non-priority communication mobile station 30B is capable of determining whether or not the non-priority communication base station 10B has received the communication enable signal, according to the receipt or non-receipt of the control signal that should be transmitted constantly from the non-priority communication base station 10B. Accordingly, the non-priority communication base station 10B does not have to transmit a new control signal, and thereby traffic can be reduced.

Modified Example 1

By referring to FIGS. 11 and 12, a mobile communication system according to a modified example 1 of the present invention will be described. Hereinafter, the modified example 1 of the present invention will be described mainly by showing different points from the mobile communication system according to the first embodiment of the present invention.

In this modified example 1, a control signal transmitter unit 16 in a non-priority communication base station 10B is configured to be enabled to transmit a control signal when the control signal transmitter unit 16 receives a communication enable signal from a priority communication system and when the control signal transmitter unit 16 detects that a non-priority communication mobile station 30B has received the communication enable signal.

In a same manner, a communication signal transmitter unit 17 in the non-priority communication base station 10B is configured to be enabled to transmit a communication signal when the communication signal transmitter unit 17 receives the communication enable signal from the priority communication system and when the communication signal transmitter unit 17 detects that the non-priority communication mobile station 30B has received the communication enable signal.

Meanwhile, a control signal transmitter unit 36 in the non-priority communication mobile station 30B is configured to be enabled to transmit a control signal when the control signal transmitter unit 36 receives the communication enable signal from the priority communication system and when the control signal transmitter unit 36 detects that the non-priority communication base station 10B has received the communication enable signal.

Similarly, a communication signal transmitter unit 37 in the non-priority communication mobile station 30B is configured to be enabled to transmit a communication signal when the control signal transmitter unit 36 receives the communication enable signal from the priority communication system and when the control signal transmitter unit 37 detects that the non-priority communication base station 10B has received the communication enable signal.

Hereinafter, operations of the mobile communication system according to this modified example will be described by referring to FIGS. 13 to 16.

Firstly, the operation of the non-priority communication base station 10B according to this modified example will be described by referring to FIGS. 13 and 14.

Figure 13:
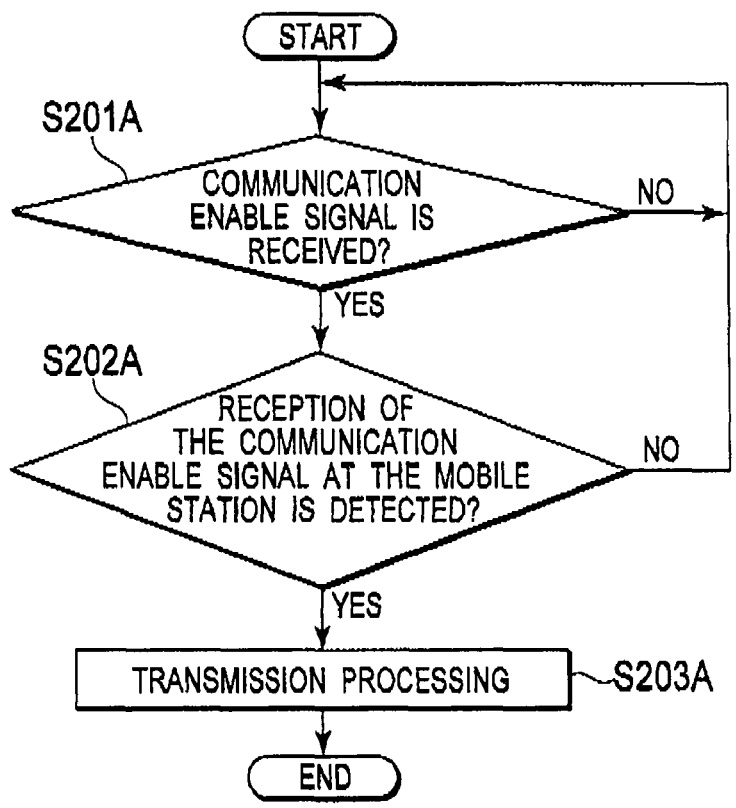
FIG. 13 is a flowchart showing an operation of a non-priority communication base station in a mobile communication system according to a modified example 1 of the present invention.

As shown in FIG. 13, in step S201A, the non-priority communication base station 10B determines whether or not the non-priority communication base station 10B has received the communication enable signal from the priority communication system.

If it is determined that the communication enable signal has been received, the operation moves forward to step S202A. Otherwise, the operation of step S201A is repeatedly executed.

In step S202A, the non-priority communication base station 10B determines whether or not the non-priority communication mobile station 30B has received the communication enable signal from the priority communication system.

Here, the non-priority communication base station 10B determines that the non-priority communication mobile station 30B has received the communication enable signal when the non-priority communication base station 10B receives a special control signal transmitted from the non-priority communication mobile station 30B.

Incidentally, the non-priority communication mobile station 30B may transmit the special control signal through a particular frequency channel. Here, the particular frequency channel indicates a channel that may not affect any communications which use frequency channels in the priority communication frequency band A.

If it is determined that the non-priority communication mobile station 30B has received the communication enable signal, the operation moves forward to step S203A. Otherwise, the operation moves back to step S201A.

In step S203A, the non-priority communication base station 10B starts a transmission processing for the control signal and the communication signal to the non-priority communication mobile station 30B by using a frequency channel of a non-priority communication frequency band B.

Figure 14:
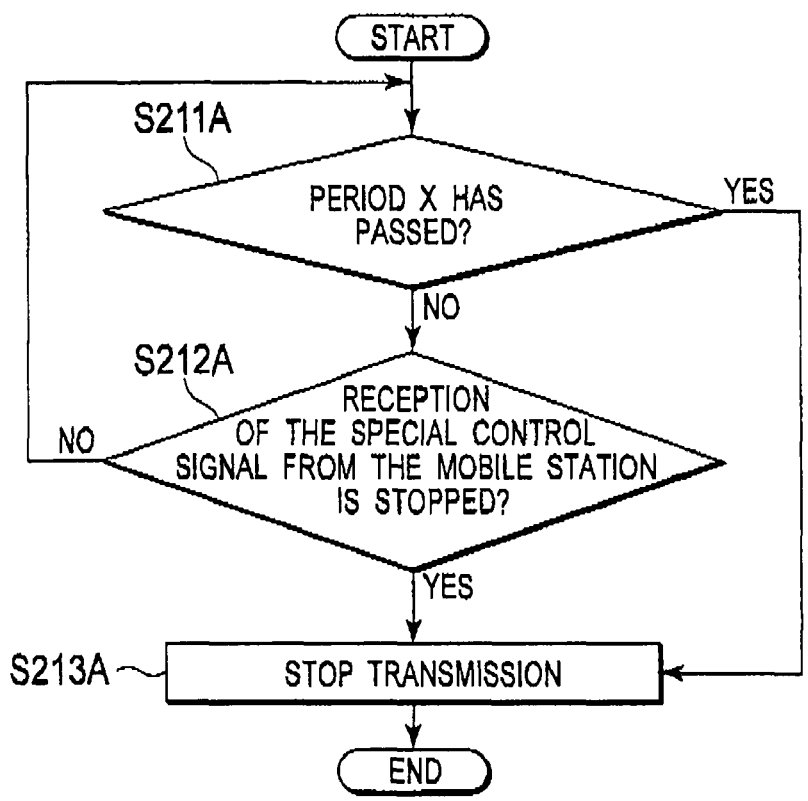
FIG. 14 is a flowchart showing an operation of a non-priority communication base station in a mobile communication system according to a modified example 1 of the present invention.

Subsequently, as shown in FIG. 14, in step S211A, the non-priority communication base station 10B determines whether or not a predetermined period X has already passed after the communication enable signal was received. Here, the predetermined period X is a time period indicated by a value specified in the communication enable signal received in step S201A.

Note that the non-priority communication base station 10B is configured to update the predetermined period X, by checking receipts of the communication enable signal constantly at regular intervals or at certain timings before the predetermined period X passes, even once after the communication enable signal was received and the transmission processing for the control signal and the communication signal was started.

If it is determined "YES" in step S211A, the operation moves forward to step S213A, while, if it is determined "NO" in step S211A, the operation moves forward to S212A.

In step S212A, the non-priority communication base station 10B determines whether or not the reception of the special control signal, which indicates the non-priority communication mobile station 30B is receiving the communication enable signal, has been stopped.

If it is determined that the reception of the special control signal has been stopped, the operation moves forward to step S213A, while if it is determined that the reception of the special control signal has not been stopped in step S212A, the operation moves back to step S211A.

In step S213A, the non-priority communication base station 10B stops the transmission processing for the control signal and the communication signal.

Secondly, operations of the non-priority communication mobile station 30B according to this modified example will be described by referring to FIGS. 15 and 16.

Figure 15:
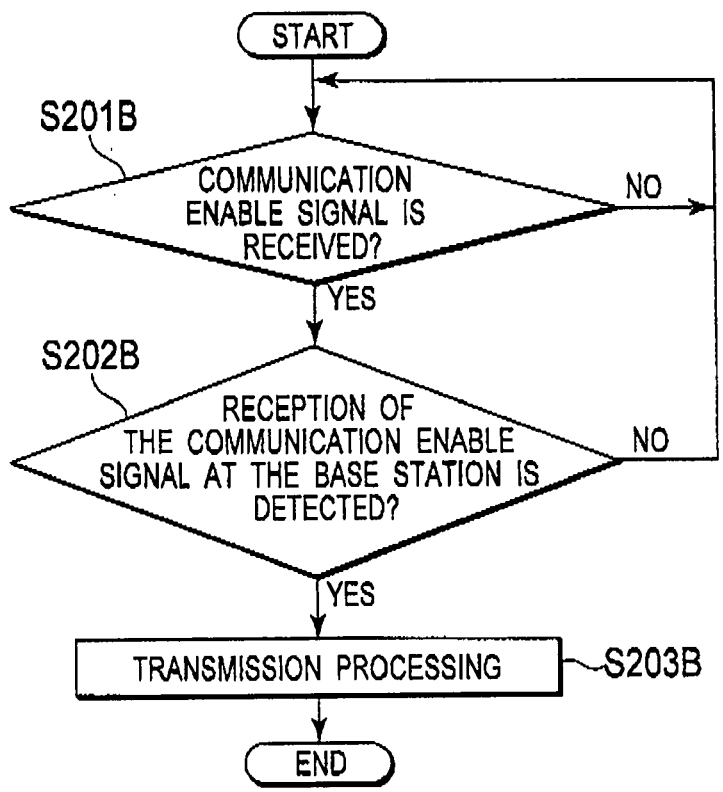
FIG. 15 is a flowchart showing the operation of the non-priority communication base station in the mobile communication system according to the modified example 1 of the present invention.

As shown in FIG. 15, in step S201B, the non-priority communication mobile station 30B determines whether or not the non-priority communication mobile station 30B has received the communication enable signal from the priority communication system.

If it is determined that the communication enable signal has been received, the operation moves forward to step S202B. Otherwise, the operation of step S201B is repeatedly executed.

In step S202B, it is determined whether or not the non-priority communication base station 10B has received the communication enable signal from the priority communication system.

Here, the non-priority communication mobile station 30B determines that the non-priority communication base station 10B has received the communication enable signal when the non-priority communication mobile station 30B receives a special control signal transmitted from the non-priority communication base station 10B.

Incidentally, the non-priority communication base station 10B may transmit the special control signal through the particular frequency channel. Here, the particular frequency channel indicates a channel that may not affect any communications which use frequency channels in the priority communication frequency band A.

If it is determined that non-priority communication base station 10B has received the communication enable signal, the operation moves forward to step S203B. Otherwise, the operation moves back to step S201B.

In step S203B, the non-priority communication mobile station 30B starts a transmission processing for the control signal and the communication signal to the non-priority communication base station 10B by using the frequency channel of the non-priority communication frequency band B.

Figure 16:
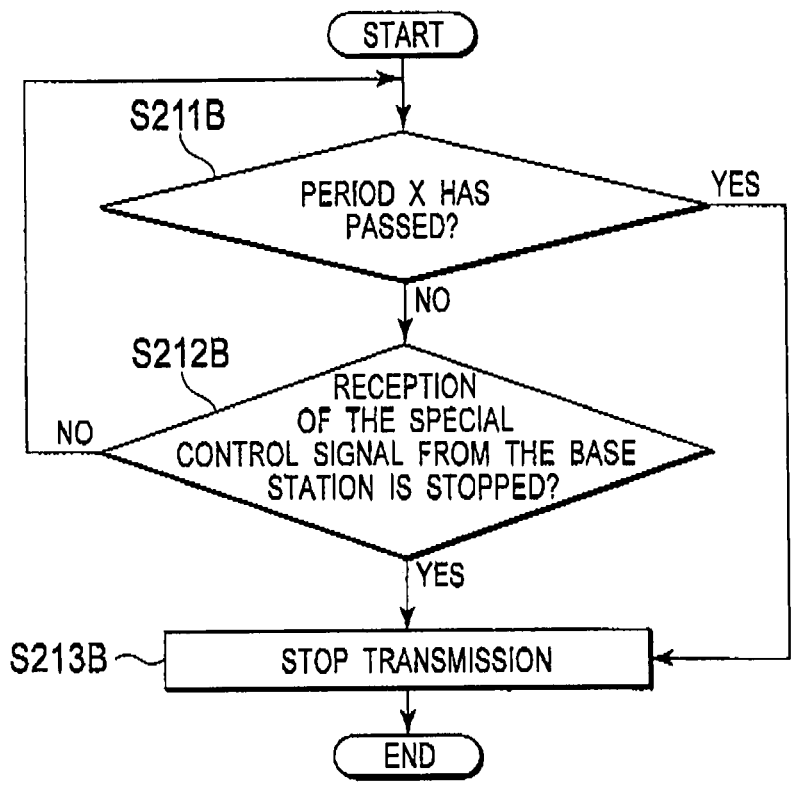
FIG. 16 is a flowchart showing the operation of the non-priority communication base station in the mobile communication system according to the modified example 1 of the present invention.

Subsequently, as shown in FIG. 16, the non-priority communication mobile station 30B determines in step S211B whether or not a predetermined period X has already passed after the communication enable signal was received. Here, the predetermined period X is a time period indicated by a value specified in the communication enable signal received in step S201B.

Note that, the non-priority communication mobile station 30B is configured to update the predetermined period X, by checking the receipts of the communication enable signal constantly at regular intervals or at certain timings before the predetermined period X passes, even once after the communication enable signal was received and the transmission processing for the control signal and the communication signal was started.

If it is determined "YES" in step S211B, the operation moves forward to step S213B, while if it is determined "NO" in step S211B, the operation moves forward to step S212B.

In step S212B, the non-priority communication mobile station 30B determines whether or not the reception of the special control signal, which indicates the non-priority communication base station 10B is receiving the communication enable signal, has been stopped.

If it is determined that the reception of the special control signal has been stopped, the operation moves forward to step S213B, while if it is determined that the reception of the special control signal has not been stopped in step S212B, the operation moves back to step S211B.

In step S213B, the non-priority communication mobile station 30B stops the transmission processing for the control signal and the communication signal.

In the mobile communication system according to the modified example 1 of the present invention, the non-priority communication base station 10B is configured to transmit signals to the non-priority communication mobile station 30B, only when both the non-priority communication base station 10B and the non-priority communication mobile station 30B receive the communication enable signals transmitted from the priority communication system. Accordingly, this mobile communication system can prioritize communications of a priority communication mobile station 30A over communications of the non-priority communication mobile station 30B more strictly in the network where the priority communication system and the non-priority communication system coexist.

In addition, in the mobile communication system according to the modified example 1 of the present invention, the non-priority communication mobile station 30B is configured to transmit signals to the non-priority communication base station 10B, only when both the non-priority communication base station 10B and the non-priority communication mobile station 30B receive the communication enable signals transmitted from the priority communication system. Accordingly, this mobile communication system can prioritize communications of a priority communication mobile station 30A over communications of the non-priority communication mobile station 30B more strictly in the network where the priority communication system and the non-priority communication system coexist.

Modified Example 2

A mobile communication system according to a modified example 2 of the present invention will be described by referring to FIGS. 17 and 18. Hereinafter, the modified example 2 of the present invention will be described mainly by showing different points from the mobile communication system according to the first embodiment of the present invention.

In this modified example 2, a non-priority communication base station 10B and a non-priority communication mobile station 30B are each configured to independently determine whether or not to start a transmission processing for the control signal and the communication signal.

Specifically, a control signal transmitter unit 16 of the non-priority communication base station 10B is configured to be enabled to transmit the control signal when the control signal transmitter unit 16 receives a communication enable signal from a priority communication system.

In a same manner, a communication signal transmitter unit 17 of the non-priority communication base station 10B is configured to be enabled to transmit the communication signal when the communication signal transmitter unit 17 receives the communication enable signal from the priority communication system.

Meanwhile, a control signal transmitter unit 36 of the non-priority communication mobile station 30B is configured to be enabled to transmit the control signal when the control signal transmitter unit 36 receives the communication enable signal from the priority communication system.

Similarly, a communication signal transmitter unit 37 of the non-priority communication mobile station 30B is configured to be enabled to transmit the communication signal when the communication signal transmitter unit 37 receives the communication enable signal from the priority communication system.

By referring to FIGS. 17 and 18, operations of the mobile communication system according to this modified example will be described. In this modified example 2, since the non-priority communication base station 10B and the non-priority communication mobile station 30B operate in the same manner, the description will be provided only for the non-priority communication base station 10B by referring to FIGS. 17 and 18.

Figure 17:
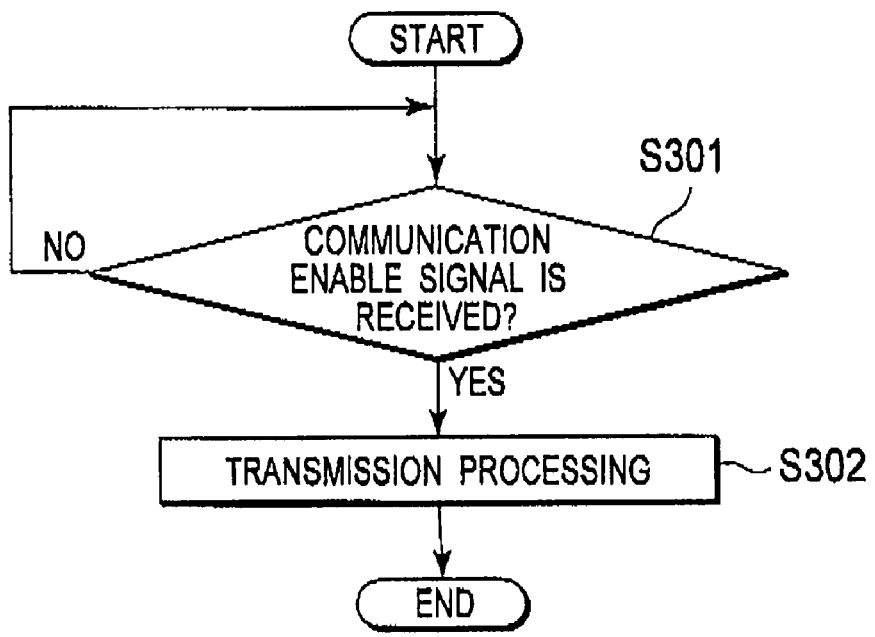
FIG. 17 is a flowchart showing the operation of the non-priority communication base station and the non-priority communication mobile station in the mobile communication system according to the modified example 2 of the present invention.

As shown in FIG. 17, in step S301, the non-priority communication base station 10B determines whether or not the non-priority communication base station 10B has received the communication enable signal from the priority communication system.

If it is determined the communication enable signal has been received, the operation moves forward to step S302. Otherwise, the operation of step S301 is repeatedly executed.

In step S302, the non-priority communication base station 10B starts a transmission processing for the control signal and the communication signal to the non-priority communication mobile station 30B by using a frequency channel of a non-priority communication frequency band B.

Figure 18:
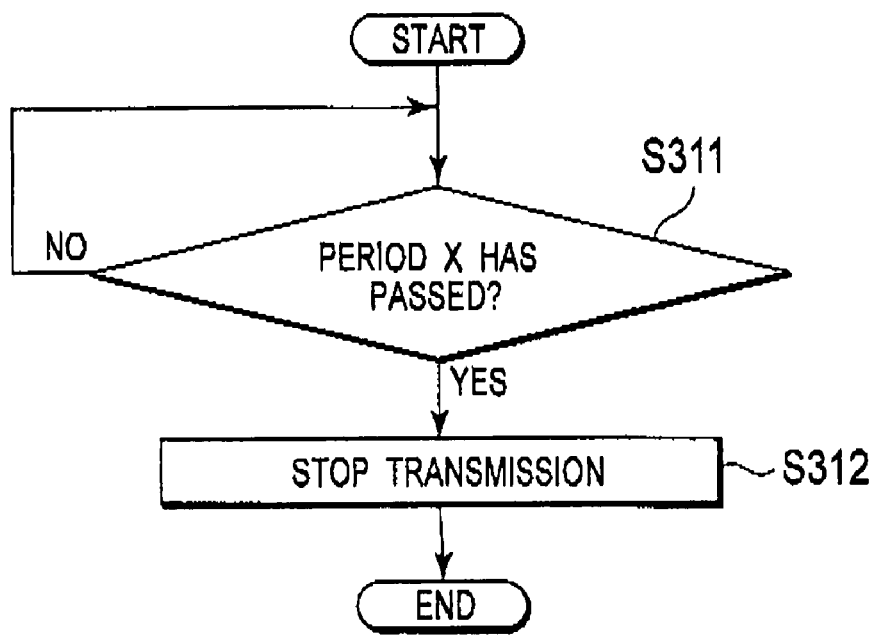
FIG. 18 is a flowchart showing the operation of the non-priority communication base station and the non-priority communication mobile station in the mobile communication system according to the modified example 2 of the present invention.

Subsequently, as shown in FIG. 18, in step S311, the non-priority communication base station 10B determines whether or not a predetermined period X has already passed after the aforementioned communication enable signal was received. Here, the predetermined period X is a time period indicated by a value specified in the communication enable signal received in step S301.

Note that the non-priority communication base station 10B is configured to update the predetermined period X, by checking receipts of the communication enable signal constantly at regular intervals or at certain timings before the predetermined period X passes, even once after the communication enable signal was received and the transmission processing for the control signal and the communication signal was started.

If it is determined "YES" in step S311, the operation moves forward to step S312, while if it is determined "NO" in step S311, the operation of step S311 is repeatedly executed.

In step S312, the non-priority communication base station 10B stops the transmission processing for the control signal and the communication signal.

Modified Example 3

A mobile communication system according to a modified example 3 of the present invention will be described by referring to FIGS. 19 and 20. Hereinafter, the modified example 3 of the present invention will be described mainly by showing different points from the mobile communication system according to the first embodiment of the present invention.

In this modified example 3, a non-priority communication mobile station 30B does not include a communication enable signal obtaining unit 35 configured to obtain a communication enable signal transmitted from a priority communication system.

Accordingly, a control signal transmitter unit 36 of the non-priority communication mobile station 30B is configured to be enabled to transmit a control signal when the control signal transmitter unit 36 detects that a non-priority communication base station 10B has received the communication enable signal.

Additionally, a communication signal transmitter unit 37 of the non-priority communication mobile station 30B is configured to be enabled to transmit a communication signal when the communication signal transmitter unit 37 detects that the non-priority communication base station 10B has received the communication enable signal.

Hereinafter, operations of the mobile communication system according to this modified example 3 will be described by referring to FIGS. 19 and 20. Specifically, the operation of the non-priority communication mobile station 30B according to this modified example will be described by referring to FIGS. 19 and 20.

Figure 19:
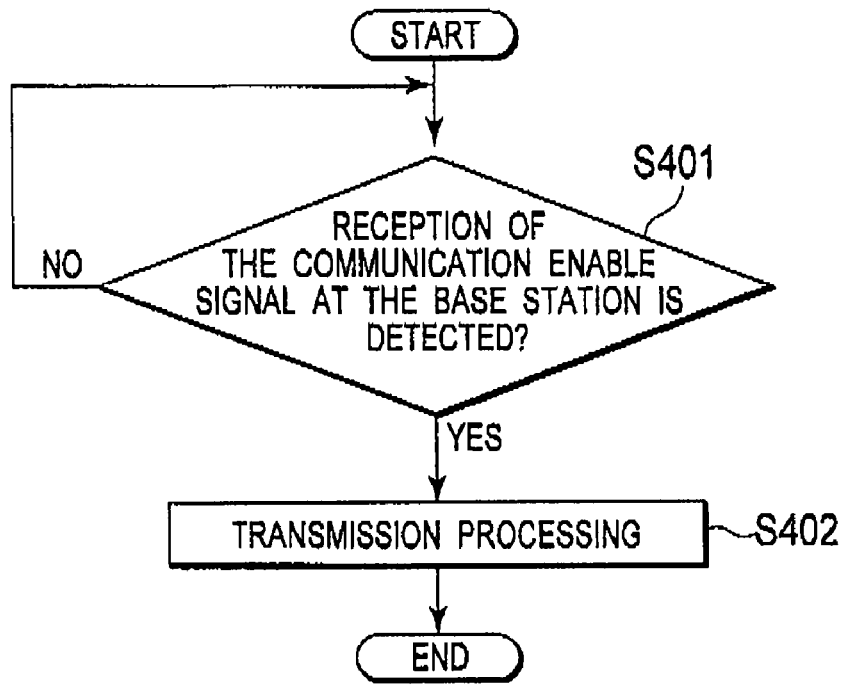
FIG. 19 is a flowchart showing an operation of a non-priority communication mobile station in a mobile communication system according to a modified example 3 of the present invention.

As shown in FIG. 19, in step S401, the non-priority communication mobile station 30B determines whether or not the non-priority communication base station 10B has received the communication enable signal from the priority communication system.

Here, the non-priority communication mobile station 30B determines that the non-priority communication base station 10B has received the communication enable signal when the non-priority communication mobile station 30B receives a special control signal transmitted from the non-priority communication base station 10B.

Incidentally, the non-priority communication base station 10B may transmit the special control signal through the particular frequency channel. Here, the particular frequency channel indicates a channel that may not affect any communications which use frequency channels in the priority communication frequency band A.

If it is determined that the non-priority communication base station 10B has received the communication enable signal, the operation moves forward to step S402. Otherwise, the operation of step S401 is repeatedly executed.

In step S402, non-priority communication mobile station 30B starts a transmission processing for the control signal and the communication signal to the non-priority communication base station 10B by using a frequency channel of the non-priority communication frequency band B.

Figure 20:
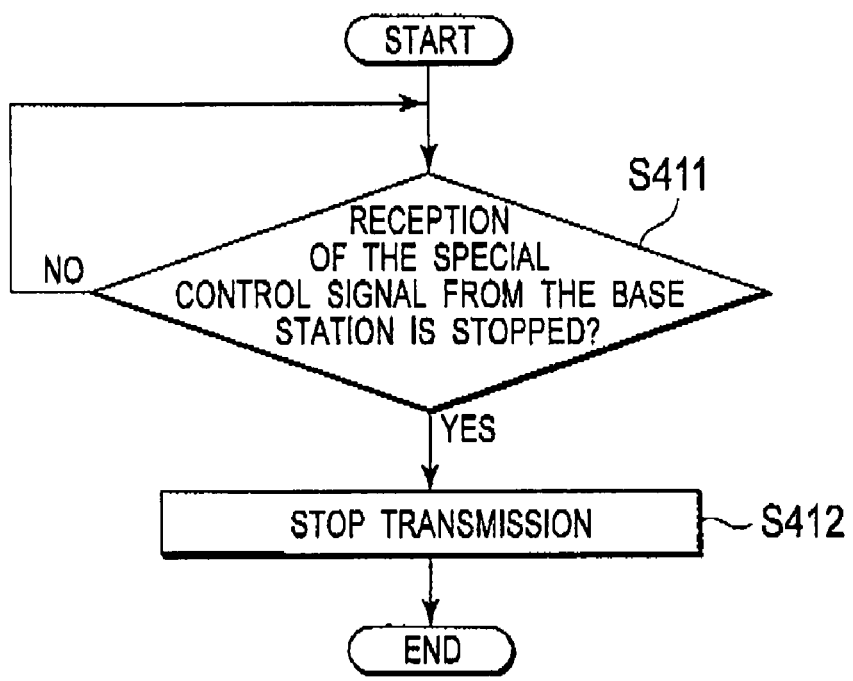
FIG. 20 is a flowchart showing the operation of the non-priority communication mobile station in the mobile communication system according to the modified example 3 of the present invention.

Subsequently, as shown in FIG. 20, in step S411, the non-priority communication mobile station 30B determines whether or not the reception of the special control signal, which indicates the non-priority communication base station 10B is receiving the communication enable signal, has been stopped.

If it is determined that the reception of the special control signal has been stopped, the operation moves forward to step S412, while if it is determined that the reception of the special control signal has not been stopped, the operation of step S411 is repeatedly executed.

In step S412, the non-priority communication mobile station 30B stops the transmission processing for the control signal and the communication signal.

As described above, since the mobile station according to the modified example 3 of the present invention does not start the transmission processing until the signal transmitted from the base station is received, it is possible to perform the communication without adding any modification for using the non-priority communication frequency band.

Modified Example 4

A mobile communication system according to a modified example 4 of the present invention will be described by referring to FIGS. 21 and 22. Hereinafter, the modified example 4 of the present invention will be described mainly by showing different points from the mobile communication system according to the first embodiment of the present invention.

Figure 21:
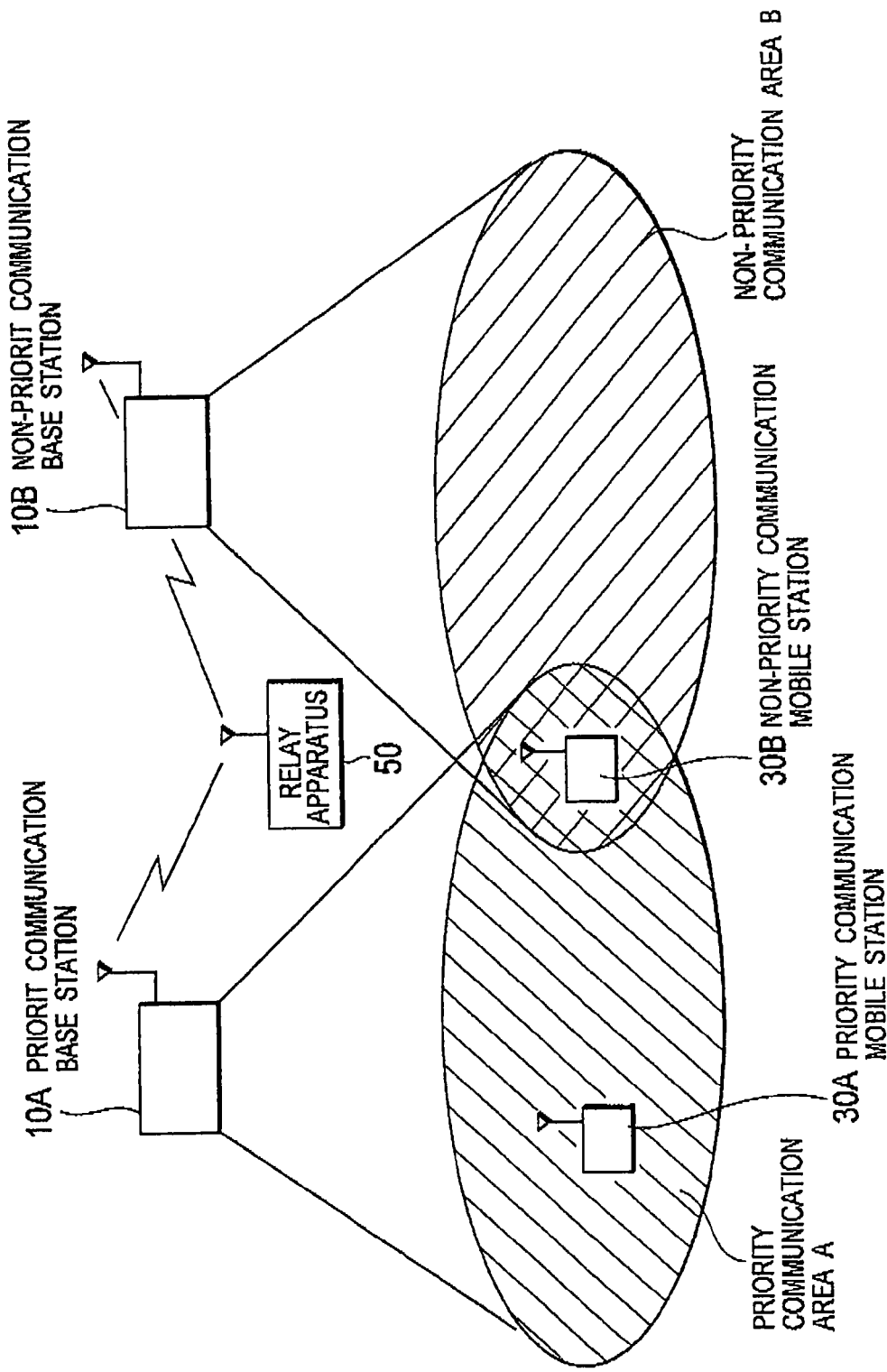
FIG. 21 is a diagram of an entire configuration of a mobile communication system according to a modified example 4 of the present invention.

As shown in FIG. 21, the mobile communication system according to this modified example 4 is provided with a relay apparatus 50 configured to relay a communication enable signal transmitted from a priority communication base station 10A, to a non-priority communication base station 10B or a non-priority communication mobile station 30B.

Figure 22:
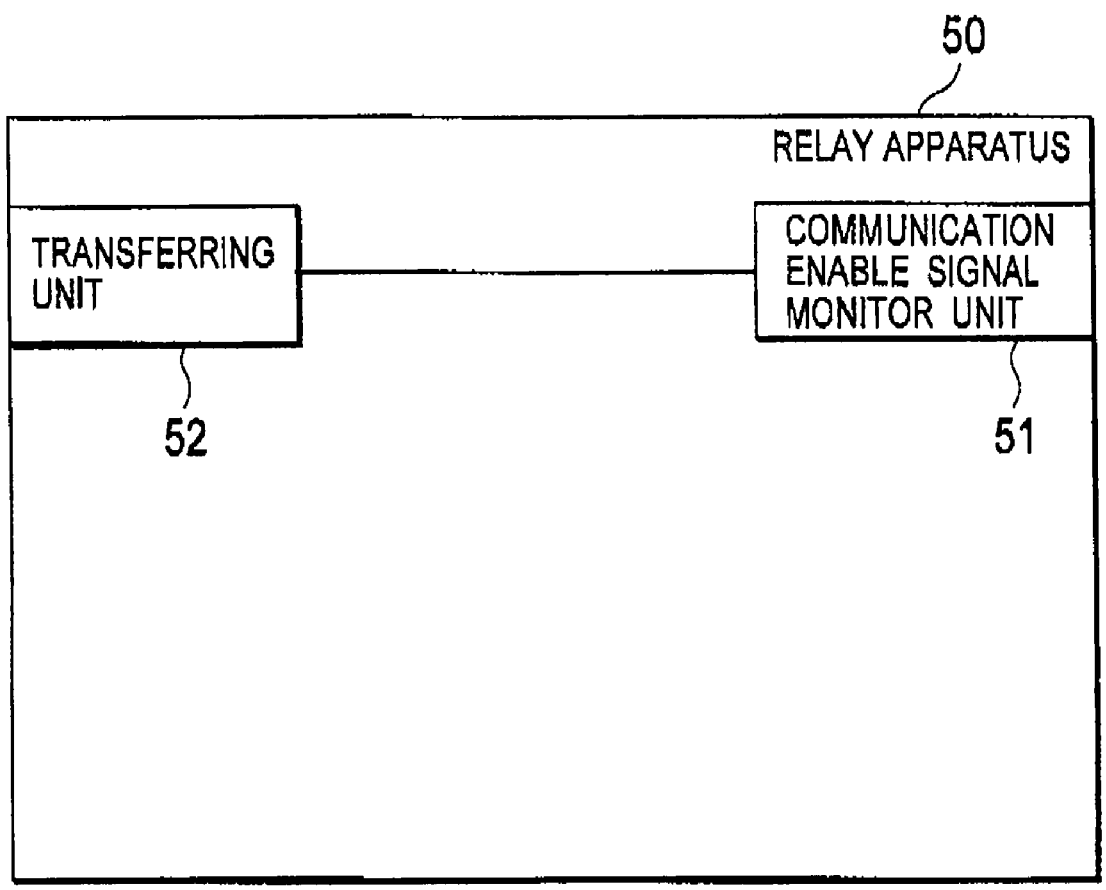
FIG. 22 is a functional block diagram of a relay apparatus according to the modified example 4 of the present invention.

As shown in FIG. 22, the relay apparatus 50 according to this modified example 4 includes a communication enable signal monitor unit 51 and a transferring unit 52.

The communication enable signal monitor unit 51 is configured to monitor the communication enable signal transmitted from the priority communication base station 10A.

The transferring unit 52 is configured to transfer the communication enable signal obtained by the communication enable signal monitor unit 51, to a particular non-priority communication system (for example, the non-priority communication base station 10B or the non-priority communication mobile station 30B).

The transferring unit 52 may be configured to transfer the communication enable signal to the non-priority communication base station 10B controlling a communication area specified by "the communication area" in the communication enable signal.

In addition, the transferring unit 52 may be configured to shorten "a predetermined period X" set for the communication enable signal when the transferring unit 52 transfers the communication enable signal.

The mobile communication system using the relay apparatus 50 is effective for a network where the communication enable signal transmitted from the priority communication base station 10A cannot reach the non-priority communication base station 10B or the non-priority communication mobile station 30B.

In addition, a control signal transmitter unit 16 and a communication signal transmitter unit 17 of the non-priority communication base station 10B may be respectively configured to shorten the predetermined period X when the non-priority communication base station 10B or the nonpriority communication mobile station 30B has received the communication enable signal through the relay apparatus 50.

Similarly, a control signal transmitter unit 36 and a communication signal transmitter unit 37 of the non-priority communication mobile station 30B may be respectively configured to shorten the predetermined period X when the non-priority communication base station 10B or the non-priority communication mobile station 30B has received the communication enable signal through the relay apparatus 50.

In this case, a flag is set for the communication enable signal received by the non-priority communication base station 10B or the non-priority communication mobile station 30B. This flag indicates whether or not the communication enable signal is transferred through the relay apparatus 50.

In the mobile communication system according to the modified example 4 of the present invention, it is possible to allow the non-priority communication system to perform communications by using a frequency channel of a non-priority communication frequency band (second frequency band) B, in consideration of a delay time in the relay apparatus 50, Modified Example 5

A mobile communication system according to a modified example 5 of the present invention will be described by referring to FIGS. 23 and 24. Hereinafter, the modified example 5 of the present invention will be described mainly by showing different points from the mobile communication system according to the first embodiment of the present invention.

Figure 23:
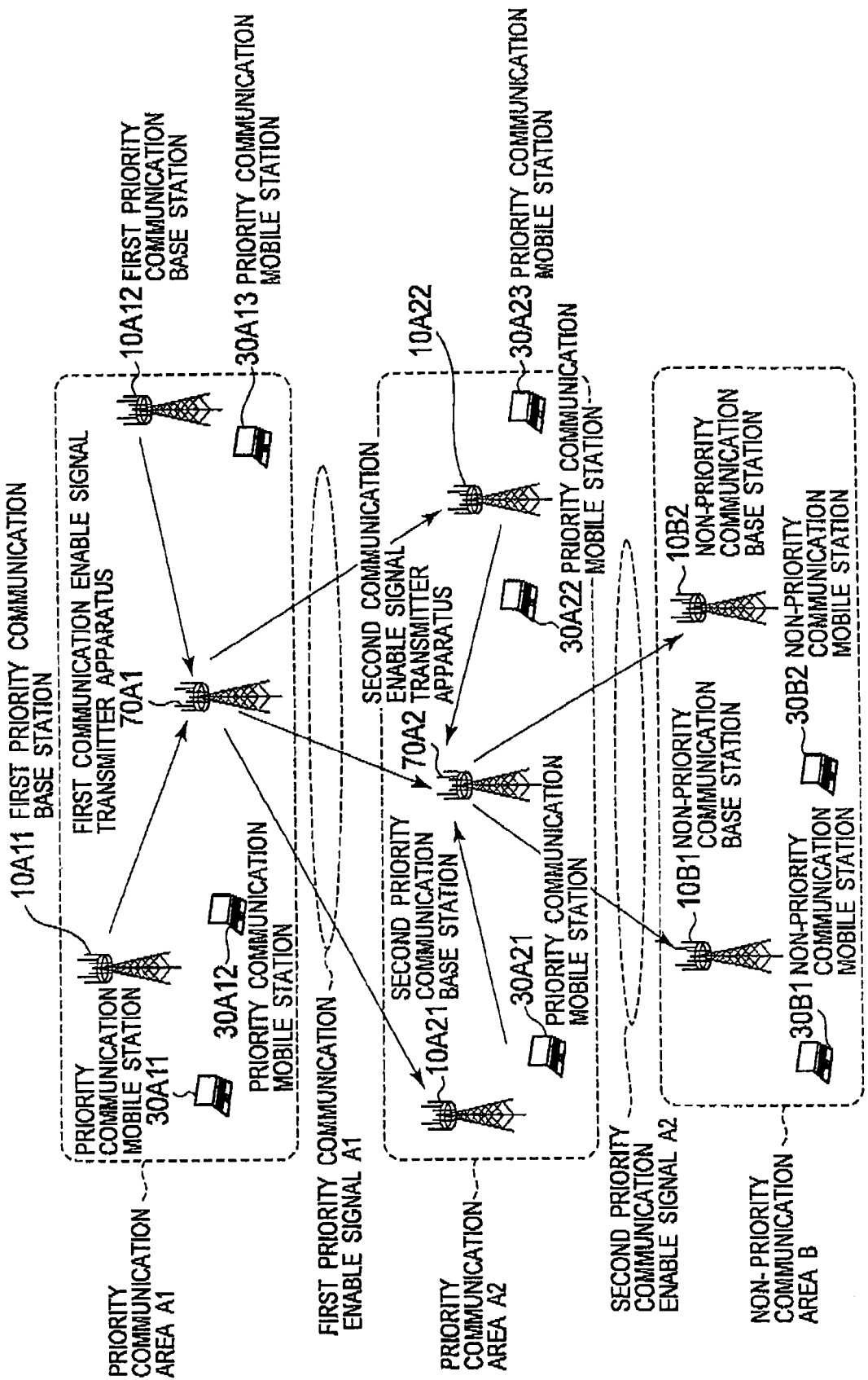
FIG. 23 is a diagram of an entire configuration of a mobile communication system according to a modified example 5 of the present invention.

As shown in FIG. 23, in the mobile communication system according to the modified example 5, a first priority communication system, a second priority communication system and a non-priority communication system coexist. Here, the first priority communication system performs a first priority communication by using a frequency channel of a first frequency band in a priority communication area A1. The second priority communication system performs a second priority communication by using a frequency channel of a second frequency band in a priority communication area A2. The non-priority communication system performs a non-priority communication by using a frequency channel of the third frequency band in the non-priority communication area B.

In this regard, the first frequency band, the second frequency band, and the third frequency band are adjacent to each other.

In the modified example 5, the priority level of the first priority communication is higher than the priority level of the second priority communication, and the priority level of the second priority communication is higher than the priority level of the non-priority communication.

Note that, although in the modified example 5 a description will be provided for a mobile communication system in which three different priority levels coexist, the present invention is not intended to be limited to the above-described description, and is also applicable to a mobile communication system in which more than four different priority level coexist.

The first priority communication system is provided with a first communication enable signal transmitter apparatus 70A1, first priority communication base stations (first base stations) 10A11 and 10A12, and first priority communication mobile stations (first mobile stations) 30A11 to 30A13.

In addition, the second priority communication system is provided with a second communication enable signal transmitter apparatus 70A2, second priority communication base stations (second base stations) 10A21 and 10A22, and second priority communication mobile stations (second mobile stations) 30A21 to 30A23.

Further, the non-priority communication system is provided with a non-priority communication base stations (third base stations) 10B1 and 10B2, and the non-priority communication mobile stations (third mobile stations) 30B1 and 30B2.

Figure 24:
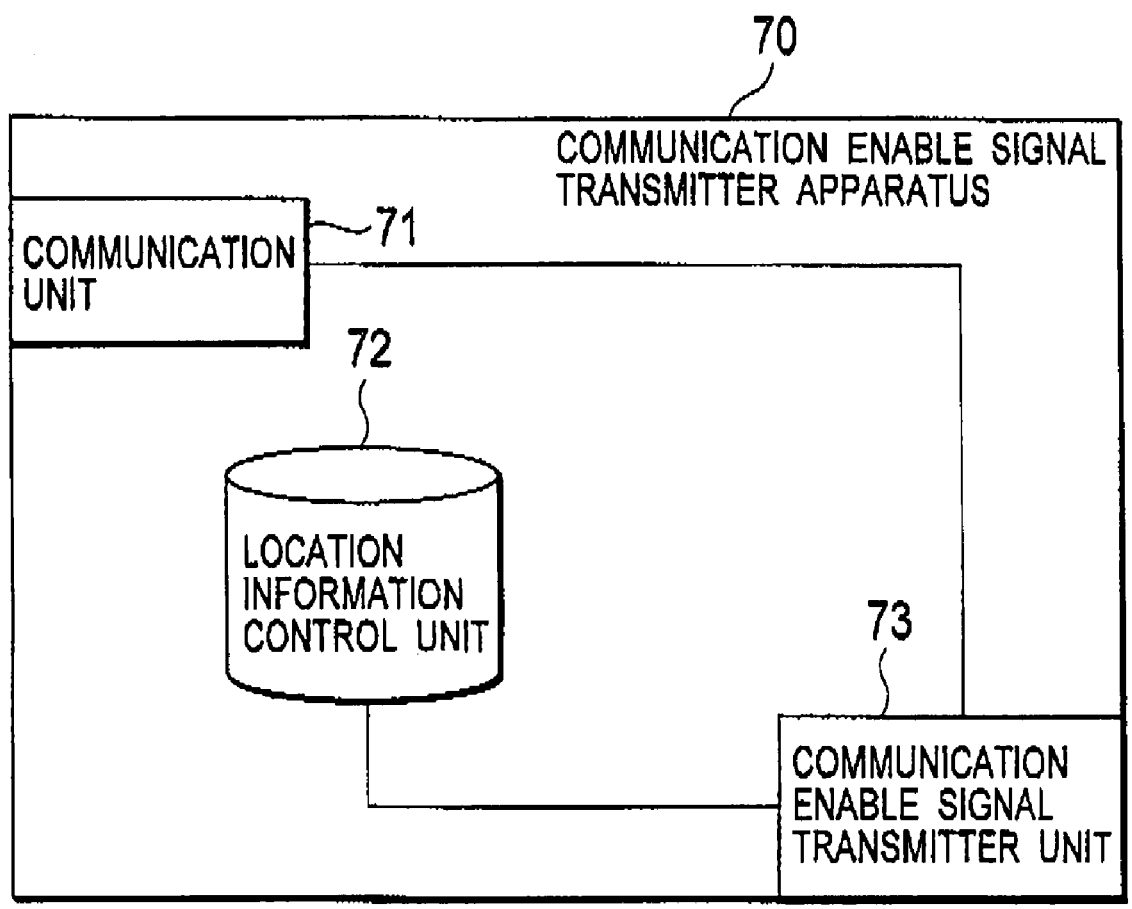
FIG. 24 is a functional block diagram of a communication enable signal transmitter apparatus according to the modified example 5 of the present invention.

As shown in FIG. 24, the first communication enable signal transmitter apparatus 70A1 is provided with a communication unit 71, a location information control unit 72, and a communication enable signal transmitter unit 73.

The communication unit 71 is configured to obtain a communication status of the first priority communication mobile stations 30A1 to 30A13 (for example, an operation status of the first priority communication mobile stations 30A11 to 30A13), from the first priority communication base stations 10A11 and 10A12.

Here, as the aforementioned communication status, the communication unit 71 may be configured to obtain, from the first priority communication base stations 10A11 and 10A12, whether or not a communication by using the frequency channel of the first frequency band is performed at the first priority communication mobile stations 30A11 to 30A13. The communication performed at the first priority communication mobile stations 30A11 to 30A13 by using the frequency channel of the first frequency band gives a great influence on a communication using the frequency channel of the second frequency band when the communication using the frequency channel of the second frequency band is performed.

The location information control unit 72 is configured to control location information of the first priority communication base stations 10A11 and 10A12, and the location information of the first communication enable signal transmitter apparatus 70A1 (for example, geographical location status).

The communication enable signal transmitter unit 73 is configured to determine, in accordance with the location information and the communication status, whether or not the first communication enable signal transmitter apparatus 70A1 should transmit the first communication enable signal to allow the second priority communication system to perform a communication by using the frequency channel of the second frequency band.

For example, the communication enable signal transmitter unit 73 may be configured to transmit the first communication enable signal when the communication enable signal transmitter unit 73 determines that the communication by using the frequency channel of the first frequency band is not performed at the first priority communication mobile stations 30A11 to 30A13.

Further, the communication enable signal transmitter unit 73 may be configured to specify an allowable transmission power that may not affect any communications using the frequency channel of the first priority communication frequency band (the communication performed at the first priority communication system), when the communication enable signal transmitter unit 73 transmits the first communication enable signal.

When the communication signal transmitter unit 17 receives the first communication enable signal from the first priority communication system or when the communication signal transmitter unit 17 detects that any one the second priority communication mobile stations 30A21 to 30A23 has received the first communication enable signal, the communication signal transmitter unit 17 (for example, see FIG. 7) of the second priority communication base stations 10A21 and 10A22 is configured to transmit, to the second priority communication mobile stations 30A21 to 30A23, a signal by using the frequency channel of the second frequency band, As shown in FIG. 24, the second communication enable signal transmitter apparatus 70A2 is provided with a communication unit 71, a location information control unit 72, and a communication enable signal transmitter unit 73.

The communication unit 71 is configured to obtain a communication status of the second priority communication mobile stations 30A21 to 30A23 (for example, operation status of the second priority communication mobile stations 30A11 to 30A13), from the first priority communication base stations 10A21 and 10A22.

Further, the communication unit 71 is configured to receive the first communication enable signal transmitted from the first communication enable signal transmitter apparatus 70A1.

Here, as the aforementioned communication status, the communication unit 71 may be configured to obtain, from the second priority communication base stations 10A21 and 10A22, whether or not a communication by using the frequency channel of the second frequency band is performed at the second priority communication mobile stations 30A21 to 30A23. The communication performed at the second priority communication mobile stations 30A21 to 30A23 by using the frequency channel of the second frequency band gives a great influence on a communication using the frequency channel of the third frequency band when the communication using the frequency channel of the third frequency band is performed.

The location information control unit 72 is configured to control location information of the second priority communication base stations 10A21 and 10A 22, and the location information of the second communication enable signal transmitter apparatus 70A2 (for example, geographical location status).

The communication enable signal transmitter unit 73 is configured to determine, in accordance with the first communication enable signal, the location information, and the communication status, whether or not the second communication enable signal transmitter apparatus 70A2 should transmit the second communication enable signal to allow the non-priority communication system to perform the communication by using the frequency channel of the third frequency band.

Specifically, the communication enable signal transmitter unit 73 is configured to determine, in response to the first communication enable signal, whether or not the second priority communication base stations 10A21 and 10A22 can transmit the signal by using the frequency channel of the second frequency band.

When it is determined that the second priority communication base stations 10A21 and 10A22 can transmit the signal by using the frequency channel of the second frequency band, the communication enable signal transmitter unit 73 is configured to determine whether or not the communication enable signal transmitter unit 73 transmits the second communication enable signal that allows the non-priority communication system to perform the communication by using the frequency channel of the third frequency band.

For example, the communication enable signal transmitter unit 73 may be configured to transmit the second communication enable signal, when the communication enable signal transmitter unit 73 receives the first communication enable signal notifying that the signal can be transmitted by using the frequency channel of the second frequency band and when the communication enable signal transmitter unit 73 determined that none of the first priority communication mobile station 30A11 to 30A13 were performing the communication by using the frequency channel of the second frequency band.

Further, the communication enable signal transmitter unit 73 may be configured to specify an allowable transmission power that may not affect any communications using the frequency channel of the second priority communication frequency band (the communication performed at the second priority communication system), when the communication enable signal transmitter unit 73 transmits the second communication enable signal.

When the communication signal transmitter unit 17 receives the second communication enable signal from the second priority communication system or when the communication signal transmitter unit 17 detects that any one of the non-priority communication mobile stations 30B1 to 30B3 has received the second communication enable signal, the communication signal transmitter unit 17 (for example, see FIG. 7) of the non-priority communication base stations 10B1 and 10B2 is configured to transmit, to the non-priority communication mobile stations 30B1 to 30B2, a signal by using the frequency channel of the third frequency band.

Note that, although in this modified example 5 a description has been provided for an example that the first communication enable signal and the second communication enable signal are respectively transmitted from the communication enable signal transmitter apparatus 70A1 and the second communication enable signal transmitter apparatus 70A2, the present invention is not intended to be limited to the above-described description, and the first communication enable signal and the second communication enable signal may be transmitted respectively from the first priority communication base stations 30A11 to 30A13, and the second priority communication base stations 10A21 to 10A22.

In addition, the communication enable signal transmitter apparatus 70A1 and the second communication enable signal transmitter apparatus 70A2 may be included in the first priority communication base stations 30A11 to 30A13, and the second priority communication base stations 10A21 to 10A22, respectively.

Modified Example 6

A mobile communication system according to a modified example 6 of the present invention will be described by referring to FIGS. 25 and 26. Hereinafter, the modified example 6 of the present invention will be described mainly by showing different points from the mobile communication system according to the first embodiment of the present invention.

Figure 25:
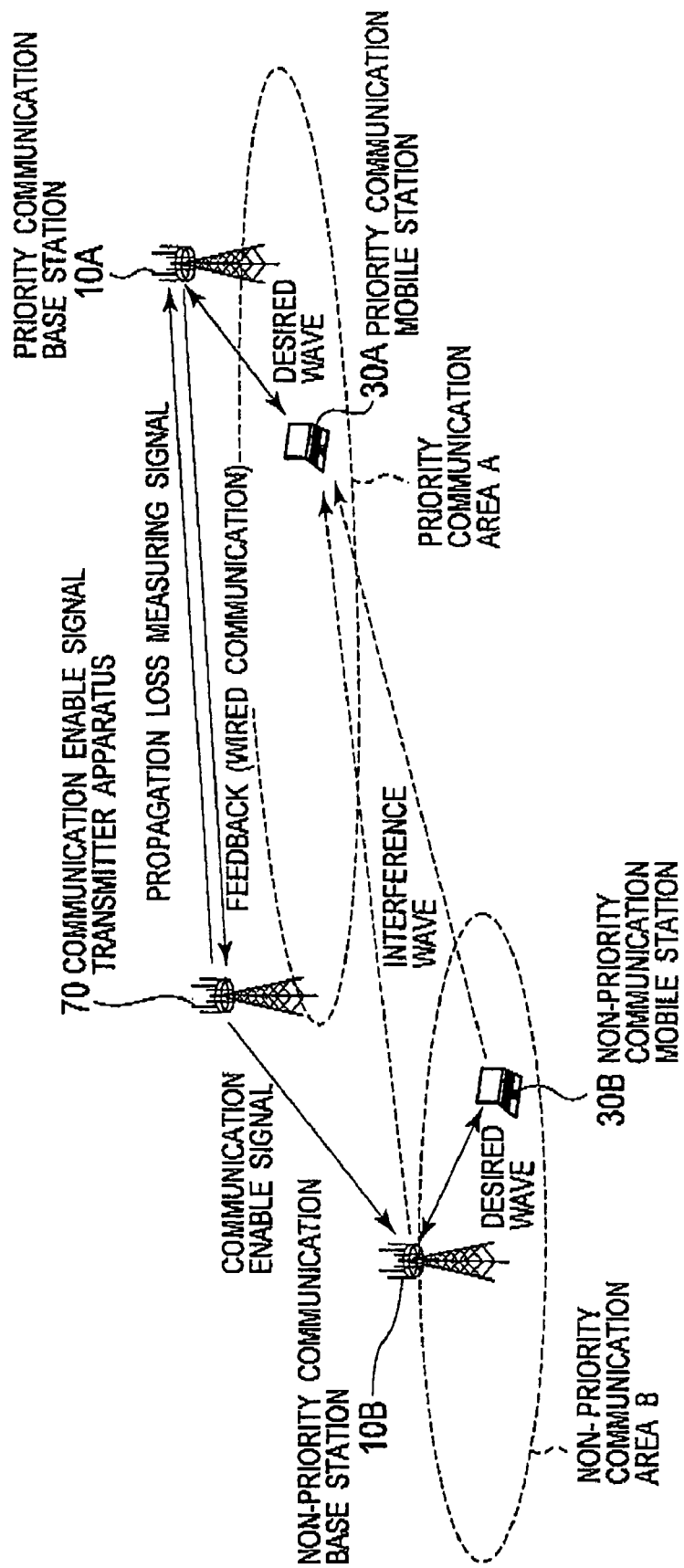
FIG. 25 is a diagram of an entire configuration of a mobile communication system according to a modified example 6 of the present invention.

As shown in FIG. 25, in the mobile communication system according to the modified example 6, a priority communication system and a non-priority communication system coexist. Here, the priority communication system performs a first priority communication by using a frequency channel of a priority communication frequency band A (a first frequency band) in a priority communication area A. The non-priority communication system performs a non-priority communication by using a frequency channel of a non-priority communication frequency band (a second frequency band) in a non-priority communication area B.

In this regard, the first frequency band A and the non-frequency band B are adjacent to each other. (see FIG. 4)

As shown in FIG. 24, the priority communication system is provided with a communication enable signal transmitter apparatus 70, a priority communication base station 10A, and a priority communication mobile station 30A. The non-priority communication system is provided with a non-priority communication base station 10B and the non-priority communication mobile station 30B.

When locations of the non-priority communication base station 10B and the priority communication base station 10A are geography distant from each other to some extent and when an interference signal level at the priority communication mobile station 30A is not smaller than a certain level, the communication enable signal transmitter apparatus 70 can improve a communication capacity of the non-priority communication system by appropriately determining an allowable transmission power specified by the communication enable signal. In other words, the communication enable signal transmitter apparatus 70 can effectively utilize the frequency band.

In such case, it is preferable that the communication enable signal transmitter apparatus 70 determines the allowable transmission power in accordance with a propagation loss amount between the non-priority communication base station 10B and the priority communication mobile station 30A. However, it is difficult to estimate the propagation loss amount between the non-priority communication base station 10B and the priority communication mobile station 30A.

Accordingly, in this modified example 6, the communication enable signal transmitter apparatus 70 is configured to determine the allowable transmission power in accordance with the propagation loss amount between the communication enable signal transmitter apparatus 70 and the priority communication base station 10A.

Figure 26:
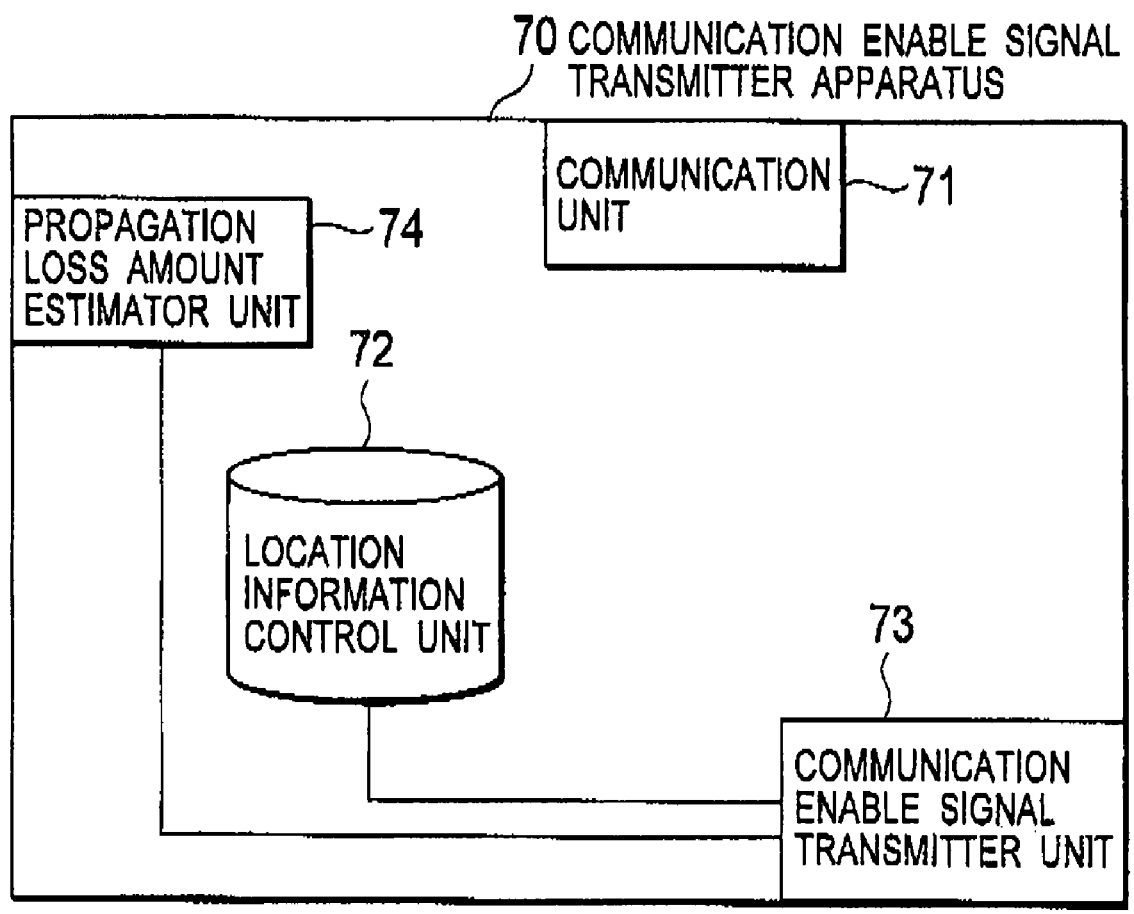
FIG. 26 is a functional block diagram of a communication enable signal transmitter apparatus according to the modified example 6 of the present invention.

As shown in FIG. 26, the communication enable signal transmitter apparatus 70 is provided with a propagation loss amount estimator unit 74, in addition to the configuration of the communication enable signal transmitter apparatus 70 shown in FIG. 24.

The propagation loss amount estimator unit 74 is configured to estimate the propagation loss amount between the communication enable signal transmitter apparatus 70 and the priority communication base station 10A.

Specifically, the propagation loss amount estimator unit 74 is configured to transmit a signal for measuring a propagation loss (hereinafter referred to as a propagation loss measuring signal), to the priority communication base station 10A. Note that, the propagation loss amount estimator unit 74 may be configured to transmit the propagation loss measuring signal repeatedly and regularly, or only once.

In a case where a plurality of the communication enable signal transmitter apparatus 70 are existed in a specific priority communication area, a transmission timing of the propagation loss measuring signal, a signal pattern of the propagation loss measuring signal (spreading code or the like), or the like are predetermined for each of the plurality of the communication enable signal transmitter apparatus 70, in order to identify the communication enable signal transmitter apparatus 70 that transmitted each of the propagation loss measuring signal.

Further, in this modified example 6, the communication enable signal transmitter apparatus 70 may be configured to transmit signals which are code-spreaded, or the like, as the propagation loss measuring signal, signals having narrower frequency bands, so that the propagation loss measuring signals certainly reaches at the priority communication base station 10A even when a distance between the communication enable signal transmitter apparatus 70 and the priority communication base station 10A is far from each other.

The priority communication base station 10A estimates the propagation loss amount between the communication enable signal transmitter apparatus 70 and the priority communication base station 10A by measuring the propagation loss amount of the propagation loss measuring signal received at the priority communication base station 10A, and transmits (feedbacks), to the communication enable signal transmitter apparatus 70, the estimation result through a wired communication or a wireless communication.

Here, the propagation loss amount estimator unit 74 estimates that the estimation result transmitted from the priority communication base station 10A is a propagation loss amount between the communication enable signal transmitter apparatus 70 and the priority communication base station 10A.

The communication enable signal transmitter unit 73 is configured to determine whether or not to transmit the communication enable signal that allows the non-priority communication system to perform a communication by using the frequency channel of the non-priority communication frequency band B, in accordance with the location information of the priority communication base station 10A, the communication status of the priority communication mobile station 30A, which is obtained by the communication unit 71 from the priority communication base station 10A, and the propagation loss amount, which is obtained by the propagation loss amount estimator unit 74.

Here, the communication enable signal transmitter unit 73 may be configured to transmit the communication enable signal that specifies, as the allowable transmission power, a transmission power that may not disturb the communication of the priority communication mobile station 30 A in the priority communication system, in accordance with the propagation loss amount between the communication enable signal transmitter apparatus 70 and the priority communication base station 10A.

Further, the communication enable signal transmitter unit 73 may be configured to determine the allowable transmission power in accordance with a propagation loss amount between the communication enable signal transmitter apparatus 70 and a specific priority communication mobile station 30A, instead of the propagation loss amount between the communication enable signal transmitter apparatus 70 and the priority communication mobile station 10A.

In such a case, the propagation loss amount estimator unit 74 transmits the propagation loss measuring signal to the specific priority communication mobile station 30A and the specific priority communication mobile station 30A measures the received propagation loss amount of the propagation loss measuring signal. Then, the priority communication mobile station 30A estimates the propagation loss amount between the communication enable signal transmitter apparatus 70 and the priority communication base station 10A, and transmits (feedbacks) the estimation result to the communication enable signal transmitter apparatus 70.

Further, in such a case, the propagation loss amount estimator unit 74 is configured to transmit the propagation loss measuring signal to the specific priority communication mobile station 30A repeatedly and constantly.

What is claimed is:

1. A mobile communication system comprising:
   a first priority communication system which performs a first priority communication by using a first frequency band,
   a second priority communication system which performs a second priority communication by using a second frequency band and has a lower priority level than the first priority communication, and
   a non-priority communication system which uses a third frequency band,
   wherein the first frequency band, the second frequency band, and the third frequency band are adjacent to each other,
   a first communication enable signal transmitter apparatus in the first priority communication system is configured to transmit a first communication enable signal to allow the second priority communication system to perform a communication by using a frequency channel of the second frequency band, in accordance with location information of a first base station in the first priority communication system and a communication status of a first mobile station in the first priority communication system,
   a second base station in the second priority communication system is configured to be enabled to transmit, to a second mobile station, a signal by using a frequency channel of the second frequency band, when the second base station receives the first communication enable signal from the first priority communication system or when the second base station detects that the second mobile station in the second priority communication system has received the first communication enable signal,
   a second communication enable signal transmitter apparatus in the second priority communication system is configured to transmit a second communication enable signal to allow the non-priority communication system to perform a communication by using a frequency channel of the third frequency band, in accordance with the first communication enable signal, location information of the second base station and a communication status of the second mobile station, and
   a third base station in the non-priority communication system is configured to be enabled to transmit, to a third mobile station, a signal by using a frequency channel of the third frequency band, when the third base station receives the second communication enable signal from the second priority communication system or when the third base station detects that the third mobile station in the non-priority communication system has received the second communication enable signal.

2. A base station used in a second priority communication system in a mobile communication system comprising a first priority communication system which performs a first priority communication by using a first frequency band, the second priority communication system which performs a second priority communication by using a second frequency band and has a lower priority level than the first priority communication, and a non-priority communication system which uses a third frequency band, wherein the first frequency band, the second frequency band, and the third frequency band are adjacent to each other, the base station comprising:
   a signal transmitter unit configured to be enabled to transmit, to a mobile station, a signal by using a frequency channel of the second frequency band, when the base station receives a first communication enable signal from the first priority communication system or when the base station detects that the mobile station in the second priority communication system has received the first communication enable signal, wherein the first communication enable signal is transmitted from the first priority communication system in accordance with location information of a base station in the first priority communication system and a communication status of a mobile station in the first priority communication system.

3. A communication enable signal transmitter apparatus used in a second priority communication system in a mobile communication system comprising a first priority communication system which performs a first priority communication by using a first frequency band, the second priority communication system which performs a second priority communication by using a second frequency band and has a lower priority level than the first priority communication, and a non-priority communication system which uses a third frequency band, wherein the first frequency band, the second frequency band, and the third frequency band are adjacent to each other, the communication enable signal transmitter apparatus comprising:
- a communication enable signal receiver unit configured to receive a first communication enable signal from the first priority communication system, and
- a communication enable signal transmitter unit configured to transmit a second communication enable signal for allowing the non-priority communication system to perform a communication by using a frequency channel of the third frequency band, when receiving the first communication enable signal from the first priority communication system, and in accordance with the first communication enable signal, location information of a base station in the second priority communication system, and a communication status of a mobile station in the second priority communication system.

4. A mobile communication system comprising a priority communication system which performs a priority communication by using a first frequency band, and a non-priority communication system which uses a second frequency band adjacent to the first frequency band, wherein
- a communication enable signal transmitter apparatus in the priority communication system is configured to transmit a communication enable signal that specifies an allowable transmission power and to allow the non-priority communication system to perform a communication by using a frequency channel of the second frequency band, in accordance with location information of a priority communication base station in the priority communication system, a communication status of a priority communication mobile station in the priority communication system, and a propagation loss amount between the priority communication base station and the communication enable signal transmitter apparatus, and
- a non-priority communication base station in the non-priority communication system is configured to be enabled to perform the communication at the allowable transmission power, by using a frequency channel of the second frequency band, between the non-priority communication base station and the non-priority communication mobile station, when the non-priority communication base station receives the communication enable signal from the non-priority communication system, or when the non-priority communication base station detects that the non-priority communication mobile station in the non-priority communication system has received the communication enable signal.

* * * * *